United States Patent
Chi et al.

(10) Patent No.: US 11,733,521 B2
(45) Date of Patent: Aug. 22, 2023

(54) HETEROGENEOUS LAYERED VOLUME BRAGG GRATING WAVEGUIDE ARCHITECTURE

(71) Applicant: Meta Platforms Technologies, LLC, Menlo Park, CA (US)

(72) Inventors: Wanli Chi, Sammamish, WA (US); Yang Yang, Redmond, WA (US); Wai Sze Tiffany Lam, Bothell, WA (US); Dominic Meiser, Bothell, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 198 days.

(21) Appl. No.: 17/178,016

(22) Filed: Feb. 17, 2021

(65) Prior Publication Data
US 2022/0260836 A1    Aug. 18, 2022

(51) Int. Cl.
*G02B 27/01* (2006.01)
*G02B 6/02* (2006.01)

(52) U.S. Cl.
CPC ....... *G02B 27/0172* (2013.01); *G02B 6/0208* (2013.01); *G02B 2027/0123* (2013.01); *G02B 2027/0174* (2013.01)

(58) Field of Classification Search
CPC ........ G02B 27/0172; G02B 2027/0123; G02B 2027/0174; G02B 6/02028
See application file for complete search history.

(56) References Cited

U.S. PATENT DOCUMENTS

| | | | |
|---|---|---|---|
| 2014/0140653 A1 | 5/2014 | Brown et al. | |
| 2018/0188528 A1 | 7/2018 | Browy et al. | |
| 2020/0400870 A1 | 12/2020 | Bhagat et al. | |
| 2021/0278739 A1* | 9/2021 | Brown | G02B 27/4272 |

FOREIGN PATENT DOCUMENTS

| | | | |
|---|---|---|---|
| JP | 2019053289 A | * 4/2019 | |
| WO | WO-2013163347 A1 | * 10/2013 | G02B 27/0081 |

OTHER PUBLICATIONS

International Search Report and Written Opinion for International Application No. PCT/US2022/016589, dated May 31, 2022, 9 pages.

* cited by examiner

*Primary Examiner* — Thomas A Hollweg
*Assistant Examiner* — Mary A El-Shammaa
(74) *Attorney, Agent, or Firm* — Weaver Austin Villeneuve & Sampson LLP

(57) ABSTRACT

A waveguide display includes a plurality of grating layers, the plurality of grating layers characterized by two or more different base refractive indices and including a set of volume Bragg gratings (VBGs). Each VBG of the set of VBGs is configured to diffract display light in a different respective field-of-view (FOV) and wavelength range. The set of VBGs includes a plurality of groups of VBGs. VBGs in each respective group of the plurality of groups of VBGs are characterized by a same grating period and include at least one VBG in each grating layer of the plurality of grating layers.

20 Claims, 22 Drawing Sheets

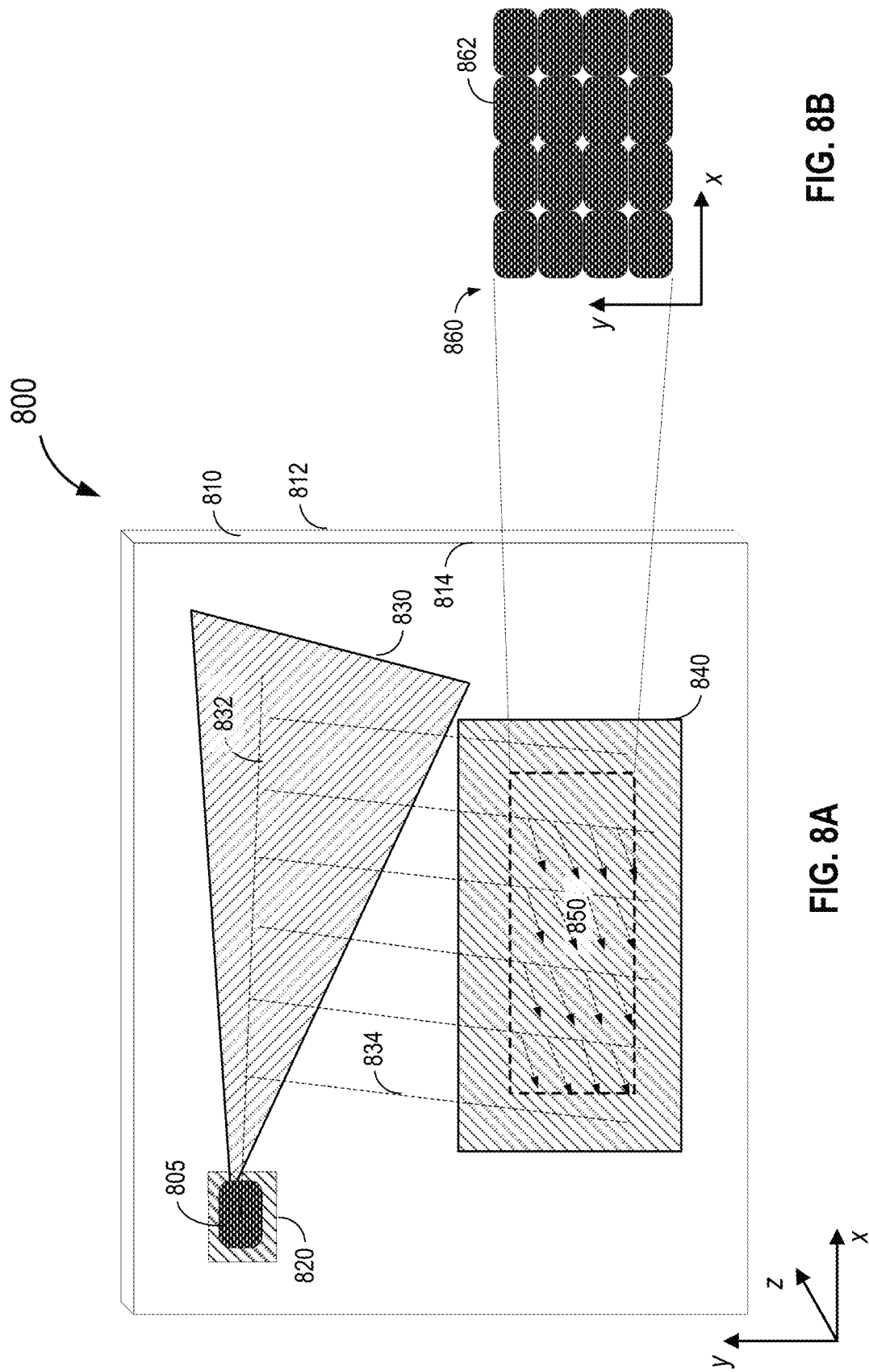

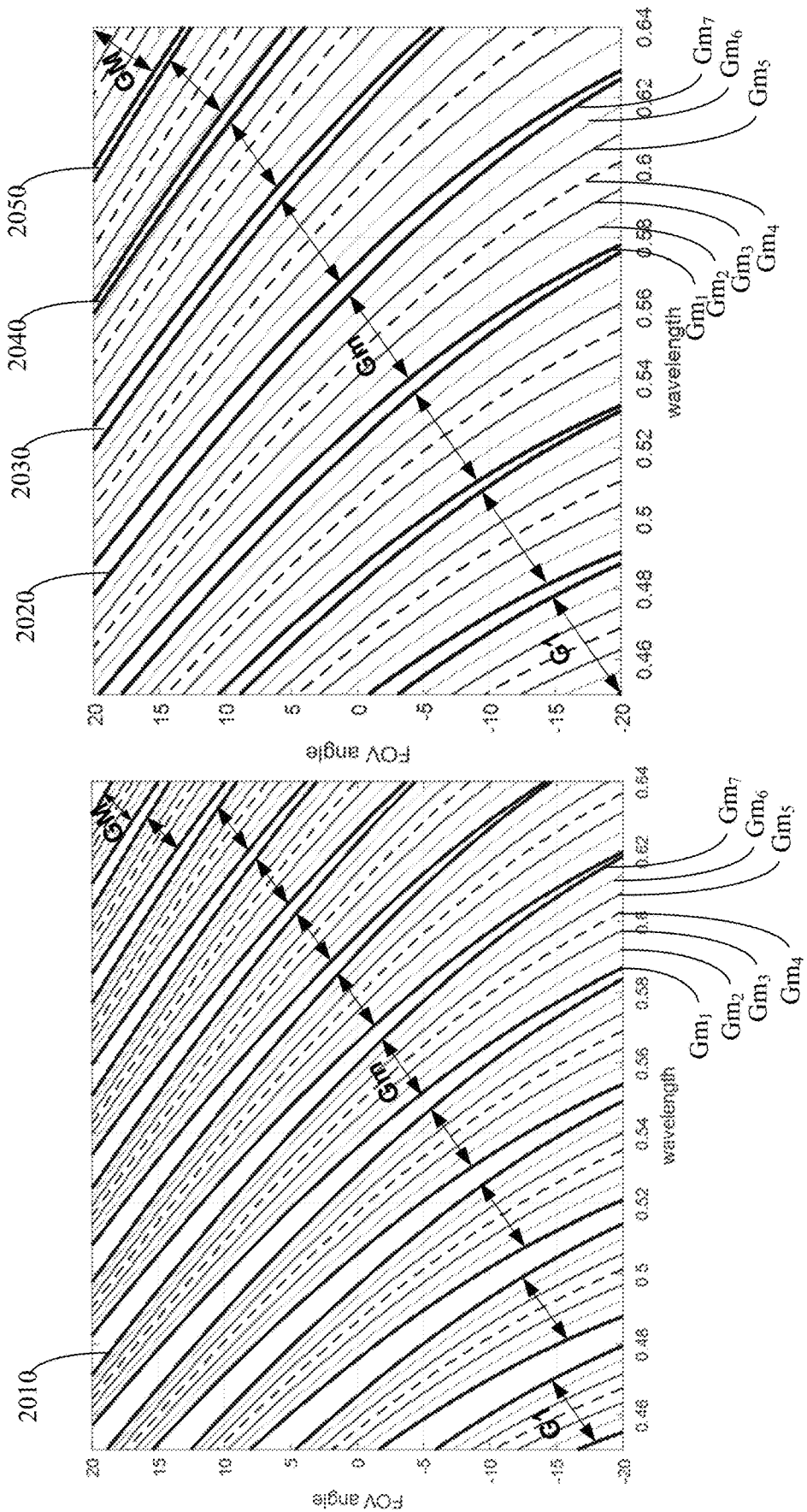

HETEROGENEOUS LAYERED VOLUME BRAGG GRATING WAVEGUIDE ARCHITECTURE

BACKGROUND

An artificial reality system, such as a head-mounted display (HMD) or heads-up display (HUD) system, generally includes a near-eye display (e.g., in the form of a headset or a pair of glasses) configured to present content to a user via an electronic or optic display within, for example, about 10-20 mm in front of the user's eyes. The near-eye display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through).

One example of an optical see-through AR system may use a waveguide-based optical display, where light of projected images may be coupled into a waveguide (e.g., a transparent substrate), propagate within the waveguide, and be coupled out of the waveguide at different locations. In some implementations, the light of the projected images may be coupled into or out of the waveguide using diffractive optical elements, such as volume holographic gratings and/or surface-relief gratings. Light from the surrounding environment may pass through a see-through region of the waveguide and reach the user's eyes as well.

SUMMARY

This disclosure relates generally to grating-based waveguide displays for near-eye display. More specifically, disclosed herein are techniques for improving the coupling efficiencies and reducing crosstalk in volume Bragg grating-based near-eye display systems. Various inventive embodiments are described herein, including devices, systems, methods, and the like.

According to some embodiments, a waveguide display may include a plurality of grating layers, the plurality of grating layers characterized by two or more different base refractive indices and including a set of volume Bragg gratings (VBGs). Each VBG of the set of VBGs may be configured to diffract display light in a different respective field-of-view (FOV) and wavelength range. The set of VBGs may include a plurality of groups of VBGs. VBGs in each respective group of the plurality of groups of VBGs may be characterized by a same grating period and include at least one VBG in each grating layer of the plurality of grating layers.

In some embodiments, each VBG of the VBGs in a group of the plurality of groups of VBGs is characterized by a different respective tilt angle. In some embodiments, a total number of grating layers of the plurality of grating layers is equal to a total number of VBGs in a group of the plurality of groups of VBGs, and each VBG of the VBGs in the group of the plurality of groups of VBGs is in a different respective grating layer of the plurality of grating layers. In some embodiments, the VBGs in each respective group of the plurality of groups of VBGs include two or more VBGs in a same grating layer of the plurality of grating layers. In some embodiments, two or more grating layers of the plurality of grating layers are characterized by a same base refractive index. The set of VBGs may include at least one of reflective VBGs or transmissive VBGs. In some embodiments, VBGs in different groups of the plurality of groups of VBGs have different grating periods.

In some embodiments, a total number of VBGs in each group of the plurality of groups of VBGs is the same for the plurality of groups of VBGs. In some embodiments, a tilt angle of an nth VBG in each group of the plurality of groups of VBGs is the same for the plurality of groups of VBGs, where n is an integer equal to or less than the total number of VBGs in each group of the plurality of groups of VBGs. In some embodiments, the plurality of grating layers includes three or more grating layers characterized by different respective base refractive indices. In some embodiments, the plurality of grating layers forms an output grating of the waveguide display, and the set of VBGs is configured to, in combination, diffract display light in a full FOV and wavelength range of the waveguide display. In some embodiments, the waveguide display may include a first substrate and a second substrate, where the plurality of grating layers is between the first substrate and the second substrate.

In some embodiments, the waveguide display may include a first waveguide assembly including a first substrate, a second substrate, and one or more grating layers of the plurality of grating layers between the first substrate and the second substrate; a second waveguide assembly including a third substrate, a fourth substrate, and one or more grating layers of the plurality of grating layers between the third substrate and the fourth substrate; and a spacer between the first waveguide assembly and the second waveguide assembly and configured to form an air gap between the first waveguide assembly and the second waveguide assembly. In some embodiments, the last VBG in a group of the plurality of groups of VBGs is in the one or more grating layers in the first waveguide assembly and the first VBG in a next group of the plurality of groups of VBGs is in the one or more grating layers in the second waveguide assembly. In some embodiments, the FOV and wavelength range of the last VBG in the group of the plurality of groups of VBGs at least partially overlaps with the FOV and wavelength range of the first VBG in the next group of the plurality of groups of VBGs. In some embodiments, the waveguide display includes one or more light sources, where each light source of the one or more light sources is configured to emit light in a respective primary color that is characterized by a full-width-half-maximum spectral width less than about 20 nm or less than about 10 nm. For example, the light sources may include lasers or superluminescent LEDs (SLEDs or SLDs).

According to some embodiments, a waveguide display may include a first substrate, a second substrate, and a plurality of grating layers between the first substrate and the second substrate. The plurality of grating layers may be characterized by two or more different base refractive indices and may include a set of volume Bragg gratings (VBGs). Each VBG of the set of VBGs may be configured to diffract display light in a different respective field-of-view (FOV) and wavelength range. Each grating layer of the plurality of grating layers may include a subset of VBGs of the set of VBGs, where VBGs in the subset of VBGs are characterized by different respective grating periods.

In some embodiments, the VBGs in the subset of VBGs are characterized by a same tilt angle. In some embodiments, a grating layer of the plurality of grating layers includes an additional subset of VBGs of the set of VBGs, and a tilt angle of an mth VBG in the subset of VBGs in the grating layer is different from a tilt angle of an mth VBG in the additional subset of VBGs in the grating layer, wherein m is equal to or less than a total number of VBGs in the subset of VBGs in the grating layer. In some embodiments, a first VBG in the subset of VBGs and a first VBG in the additional subset of VBGs are characterized by a same grating period. In some embodiments, a grating period of a first VBG in the subset of VBGs in each grating layer of the plurality of grating layers is the same for the plurality of grating layers. In some embodiments, the plurality of grating layers forms an output grating of the waveguide display, and the set of VBGs is configured to, in combination, diffract display light in a full FOV and wavelength range of the waveguide display.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 8A illustrates an example of an optical see-through augmented reality system including a waveguide display and gratings for exit pupil expansion according to certain embodiments.

FIG. 8B illustrates an example of an eyebox including two-dimensional replicated exit pupils according to certain embodiments.

FIG. 20A illustrates FOV and wavelength ranges covered by reflective VBGs in a simplified example of a waveguide display that includes grating layers having a same base refractive index.

FIG. 20B illustrates FOV and wavelength ranges covered by reflective VBGs in a simplified example of a waveguide display that includes grating layers having different base refractive indices according to certain embodiments.

Figure 1:
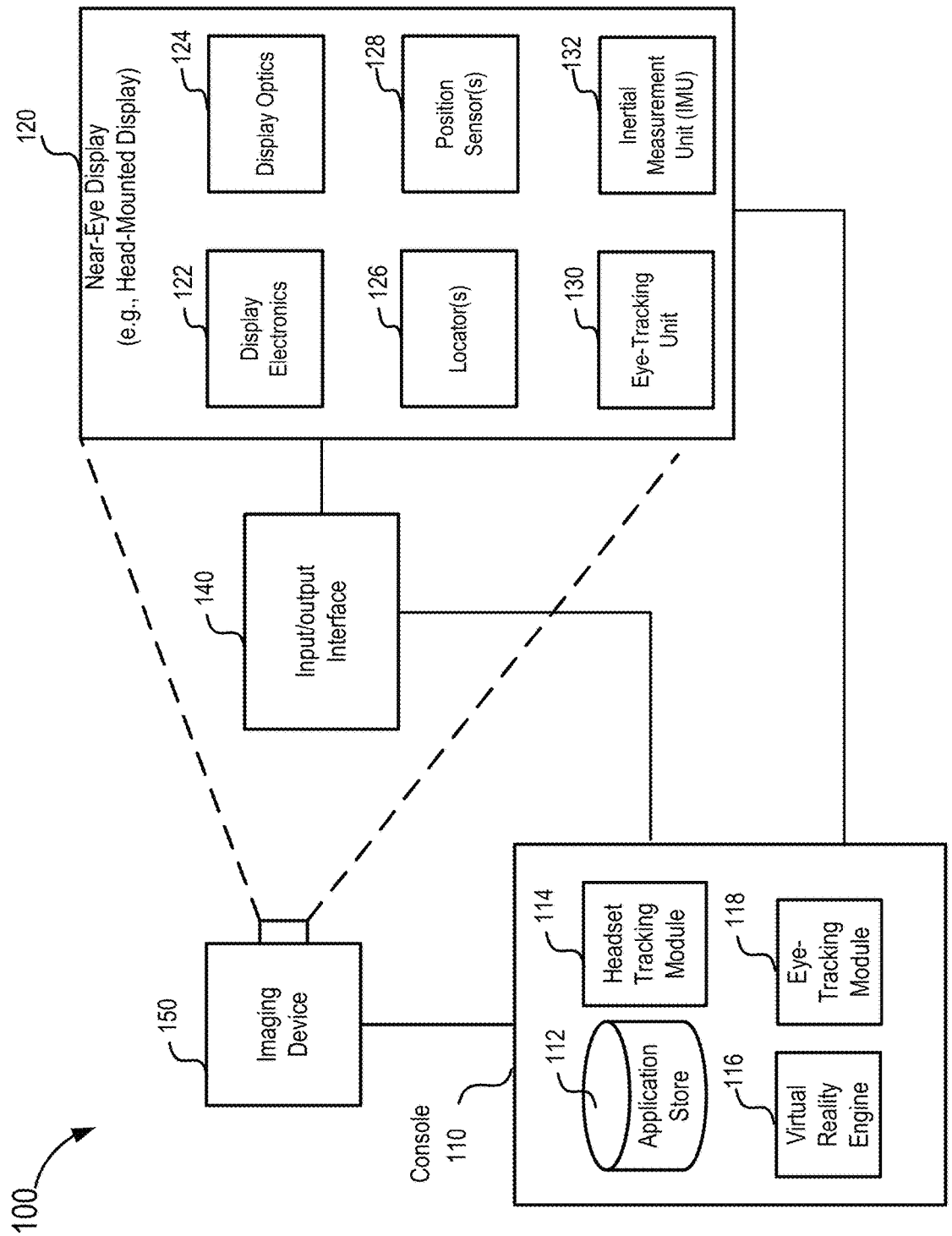
FIG. 1 is a simplified block diagram of an example of an artificial reality system environment including a near-eye display system according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

This disclosure relates generally to grating-based waveguide displays for near-eye display. More specifically, disclosed herein are techniques for improving the coupling efficiencies and reducing crosstalk in grating-based near-eye display systems. Various inventive embodiments are described herein, including devices, systems, methods, and the like.

In a near-eye display system, it is generally desirable to expand the eyebox, improve image quality (e.g., resolution and contrast), reduce physical size, increase power efficiency, and increase the field of view (FOV). In a waveguide-based near-eye display system, light of projected images may be coupled into a waveguide (e.g., a substrate), propagate within the waveguide, and be coupled out of the waveguide at different locations to replicate exit pupils and expand the eyebox. Two or more gratings may be used to expand the eyebox in two dimensions. In a waveguide-based near-eye display system for augmented reality applications, light from the surrounding environment may pass through at least a see-through region of the waveguide display (e.g., the substrate) and reach the user's eyes. In some implementations, the light of the projected images may be coupled into or out of the waveguide using diffractive optical elements, such as gratings, which may also allow light from the surrounding environment to pass through.

Couplers implemented using diffractive optical elements may have a limited field of view due to the angular dependence of grating efficiency. Therefore, light incident on the couplers from multiple incident angles (e.g., from different field-of-view angle) may not be diffracted at equivalent or similar efficiency. In some embodiments, to achieve the desired FOV, coupling efficiency, and coupling efficiency uniformity across the full FOV and wavelength (color) range, multiple grating layers including multiplexed VBGs may be formed on one or more waveguide plates. Each grating layer may be used to couple light in a certain FOV and wavelength range at a relatively high efficiency, and the combination of the multiple grating layers may provide full coverage of the full FOV and wavelength range at relatively high and uniform coupling efficiencies. When the number of VBGs multiplexed in the multiple grating layers is low, there may be some FOV and wavelength ranges not covered by the gratings. On the other hand, crosstalk may occur between gratings when the FOV and wavelength ranges covered by different VBGs multiplexed in the multiple grating layers have some overlaps. Thus, loosely multiplexed VBGs may have lower efficiencies for some fields of view or wavelengths, whereas densely multiplexed VBG may have FOV and wavelength range overlap and thus crosstalk between the VBGs that may cause ghost images or other undesired optical artifacts.

According to certain embodiments, to provide the full field-of-view and wavelength coverage while minimizing crosstalk, VBGs for a waveguide display may be recorded in multiple holographic material layers, where the multiple holographic material layers may not have the same base refractive index. For example, in some embodiments, each holographic material layer may have a different respective based refractive index. In some embodiments, some holographic material layers may have the same base refractive index, but some other holographic material layers may have a different base refractive index. In some embodiments, VBGs recorded in a same holographic material layer may have different grating periods and the same or different tilt angles, and may have very different FOV and wavelength coverage. In some embodiments, some VBGs recorded in a same holographic material layer may have the same or similar grating period, but may have very different tilt angles, and thus may have very different FOV and wavelength coverage. Therefore, the field-of-view and wavelength ranges covered by the VBGs in a same holographic material layer may not overlap. As such, there may not be crosstalk between the VBGs in the same grating layer. In addition, because of the large difference in the Bragg conditions and the FOV and wavelength coverage, VBGs already recorded in the holographic material layer may not interfere with or may only minimally interfere with the subsequent recordings of other VBGs.

The VBGs in the multiple holographic material layers may be arranged into multiple groups. For example, the VBGs may be grouped based on their grating periods, where VBGs in a same group may have the same grating periods, but may have different grating tilt angles and/or different base refractive indices (e.g., in different grating layers) in order to have different FOV and wavelength coverage. In some embodiments, VBGs in a same group may be in different respective grating layers. In some embodiments, some VBGs in a group may be in a same grating layer and may have a large difference in the grating tilt angle such that their FOV and wavelength ranges may not overlap. There may not be crosstalk between VBGs in a same group, due to their common grating period and/or large difference in the FOV and wavelength ranges.

In one example, each grating layer may include M VBGs. The first VBG in each of the multiple holographic material layers may have the same grating period but may have a different respective tilt angle and/or base refractive index. Thus, the first VBGs in the respective holographic material layers may cover different respective FOV and wavelength ranges due to the different tilt angles and/or different base refractive indices. The first VBGs in the respective holographic material layers may form a group (e.g., a first group G1) of VBGs having the same grating period, and thus may have no crosstalk between them due to the same grating period (and the same diffraction angle). A second VBG in each of the holographic material layers may have the same grating period but may have a different respective tilt angle and/or base refractive index. Thus, the second VBGs in the respective holographic material layers may cover different respective FOV and wavelength ranges due to the different tilt angles and/or different base refractive indices. The second VBGs in the respective holographic material layers may form a group (e.g., a second group G2) of VBGs having the same grating period, and may have no crosstalk between them due to the same grating period (and the same diffraction angle). The grating period of the second VBG in each holographic material layer may be different from the grating period of the first VBG in each holographic material layer. Therefore, the second VBG in each holographic material layer may cover a different FOV and wavelength range compared with the first VBG in each holographic material layer. Similarly, the mth (for $1 \leq m \leq M$) VBG in each of the holographic material layers may have the same grating period but may have a different respective tilt angle and/or base refractive index. Thus, the mth VBGs in the respective holographic material layers may cover different respective FOV and wavelength ranges due to the different tilt angles and/or different base refractive indices. The mth VBGs in the respective holographic material layers may form a group (the mth group Gm) of VBGs having the same grating period, and thus may have no crosstalk between them due to the same grating period and the same diffraction angle.

In this way, VBGs in the same holographic material layer may not have crosstalk between them at least because of the large difference in the grating period and the corresponding FOV and wavelength range. In addition, each group of VBGs in the multiple holographic material layers (e.g., the mth group Gm) may have the same grating period, and thus may not have crosstalk between them because of the same grating period. Therefore, crosstalk between the VBGs can be significantly reduced, and the full FOV and wavelength range may be covered.

In some embodiments, a waveguide display may include more than one waveguide assembly, such as two or more waveguide assemblies, where each waveguide assembly may include one or more grating layers. In some embodiments, the last VBG and the first VBG in each group may be in two different grating layers that are in two different respective waveguide assemblies, and may have at least partially overlapping FOV and wavelength coverage. As such, the full FOV range of the waveguide display can be covered using narrowband light sources (e.g., superluminescent LEDs, lasers, etc.) without having crosstalk between the VBGs.

In the following description, various inventive embodiments are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display 120 in accordance with certain embodiments. Artificial reality system environment 100 shown in FIG. 1 may include near-eye display 120, an optional external imaging device 150, and an optional input/output interface 140, each of which may be coupled to an optional console 110. While FIG. 1 shows an example of artificial reality system environment 100 including one near-eye display 120, one external imaging device 150, and one input/output interface 140, any number of these components may be included in artificial reality system environment 100, or any of the components may be omitted. For example, there may be multiple near-eye displays 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display 120 may be a head-mounted display that presents content to a user. Examples of content presented by near-eye display 120 include one or more of images, videos, audio, or any combination thereof. In some embodiments, audio may be presented via an external device (e.g., speakers and/or headphones) that receives audio information from near-eye display 120, console 110, or both, and presents audio data based on the audio information. Near-eye display 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display 120 may be implemented in any suitable form-factor, including a pair of glasses. Some embodiments of near-eye display 120 are further described below with respect to FIGS. 2 and 3. Additionally, in various embodiments, the functionality described herein may be used in a headset that combines images of an environment external to near-eye display 120 and artificial reality content (e.g., computer-generated images). Therefore, near-eye display 120 may augment images of a physical, real-world environment external to near-eye display 120 with generated content (e.g., images, video, sound, etc.) to present an augmented reality to a user.

In various embodiments, near-eye display 120 may include one or more of display electronics 122, display optics 124, and an eye-tracking unit 130. In some embodiments, near-eye display 120 may also include one or more locators 126, one or more position sensors 128, and an inertial measurement unit (IMU) 132. Near-eye display 120 may omit any of eye-tracking unit 130, locators 126, position sensors 128, and IMU 132, or include additional elements in various embodiments. Additionally, in some embodiments, near-eye display 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMOLED), a transparent OLED display (TOLED), or some other display. For example, in one implementation of near-eye display 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereoscopic effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (e.g., a perception of image depth by a user viewing the image).

In certain embodiments, display optics 124 may display image content optically (e.g., using optical waveguides and couplers) or magnify image light received from display electronics 122, correct optical errors associated with the image light, and present the corrected image light to a user of near-eye display 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display 120.

Display optics 124 may also be designed to correct one or more types of optical errors, such as two-dimensional optical errors, three-dimensional optical errors, or any combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display 120 relative to one another and relative to a reference point on near-eye display 120. In some implementations, console 110 may identify locators 126 in images captured by external imaging device 150 to determine the artificial reality headset's position, orientation, or both. A locator 126 may be an LED, a corner cube reflector, a reflective marker, a type of light source that contrasts with an environment in which near-eye display 120 operates, or any combination thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may include one or more cameras, one or more video cameras, any other device capable of capturing images including one or more of locators 126, or any combination thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display 120. Examples of position sensors 128 may include accelerometers, gyroscopes, magnetometers, other motion-detecting or error-correcting sensors, or any combination thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or any combination thereof. Based on the one or more measurement signals from one or more position sensors 128, IMU 132 may generate fast calibration data indicating an estimated position of near-eye display 120 relative to an initial position of near-eye display 120. For example, IMU 132 may integrate measurement signals received from accelerometers over time to estimate a velocity vector and integrate the velocity vector over time to determine an estimated position of a reference point on near-eye display 120. Alternatively, IMU 132 may provide the sampled measurement signals to console 110, which may determine the fast calibration data. While the reference point may generally be defined as a point in space, in various embodiments, the reference point may also be defined as a point within near-eye display 120 (e.g., a center of IMU 132).

Eye-tracking unit 130 may include one or more eye-tracking systems. Eye tracking may refer to determining an eye's position, including orientation and location of the eye, relative to near-eye display 120. An eye-tracking system may include an imaging system to image one or more eyes and may optionally include a light emitter, which may generate light that is directed to an eye such that light reflected by the eye may be captured by the imaging system. For example, eye-tracking unit 130 may include a non-coherent or coherent light source (e.g., a laser diode) emitting light in the visible spectrum or infrared spectrum, and a camera capturing the light reflected by the user's eye. As another example, eye-tracking unit 130 may capture reflected radio waves emitted by a miniature radar unit. Eye-tracking unit 130 may use low-power light emitters that emit light at frequencies and intensities that would not injure the eye or cause physical discomfort. Eye-tracking unit 130 may be arranged to increase contrast in images of an eye captured by eye-tracking unit 130 while reducing the overall power consumed by eye-tracking unit 130 (e.g., reducing power consumed by a light emitter and an imaging system included in eye-tracking unit 130). For example, in some implementations, eye-tracking unit 130 may consume less than 100 milliwatts of power.

Near-eye display 120 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or any combination thereof. Because the orientation may be determined for both eyes of the user, eye-tracking unit 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, external imaging device 150 may be used to track input/output interface 140, such as tracking the location or position of a controller (which may include, for example, an IR light source) or a hand of the user to determine the motion of the user. In some embodiments, near-eye display 120 may include one or more imaging devices to track input/output interface 140, such as tracking the location or position of a controller or a hand of the user to determine the motion of the user.

Console 110 may provide content to near-eye display 120 for presentation to the user in accordance with information received from one or more of external imaging device 150, near-eye display 120, and input/output interface 140. In the example shown in FIG. 1, console 110 may include an application store 112, a headset tracking module 114, an artificial reality engine 116, and an eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display 120 using slow calibration information from external imaging device 150. For example, headset tracking module 114 may determine positions of a reference point of near-eye display 120 using observed locators from the slow calibration information and a model of near-eye display 120. Headset tracking module 114 may also determine positions of a reference point of near-eye display 120 using position information from the fast calibration information. Additionally, in some embodiments, headset tracking module 114 may use portions of the fast calibration information, the slow calibration information, or any combination thereof, to predict a future location of near-eye display 120. Headset tracking module 114 may provide the estimated or predicted future position of near-eye display 120 to artificial reality engine 116.

Artificial reality engine 116 may execute applications within artificial reality system environment 100 and receive position information of near-eye display 120, acceleration information of near-eye display 120, velocity information of near-eye display 120, predicted future positions of near-eye display 120, or any combination thereof from headset tracking module 114. Artificial reality engine 116 may also receive estimated eye position and orientation information from eye-tracking module 118. Based on the received information, artificial reality engine 116 may determine content to provide to near-eye display 120 for presentation to the user. For example, if the received information indicates that the user has looked to the left, artificial reality engine 116 may generate content for near-eye display 120 that mirrors the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display 120 or haptic feedback via input/output interface 140.

Eye-tracking module 118 may receive eye-tracking data from eye-tracking unit 130 and determine the position of the user's eye based on the eye tracking data. The position of the eye may include an eye's orientation, location, or both relative to near-eye display 120 or any element thereof. Because the eye's axes of rotation change as a function of the eye's location in its socket, determining the eye's location in its socket may allow eye-tracking module 118 to more accurately determine the eye's orientation.

Figure 2:
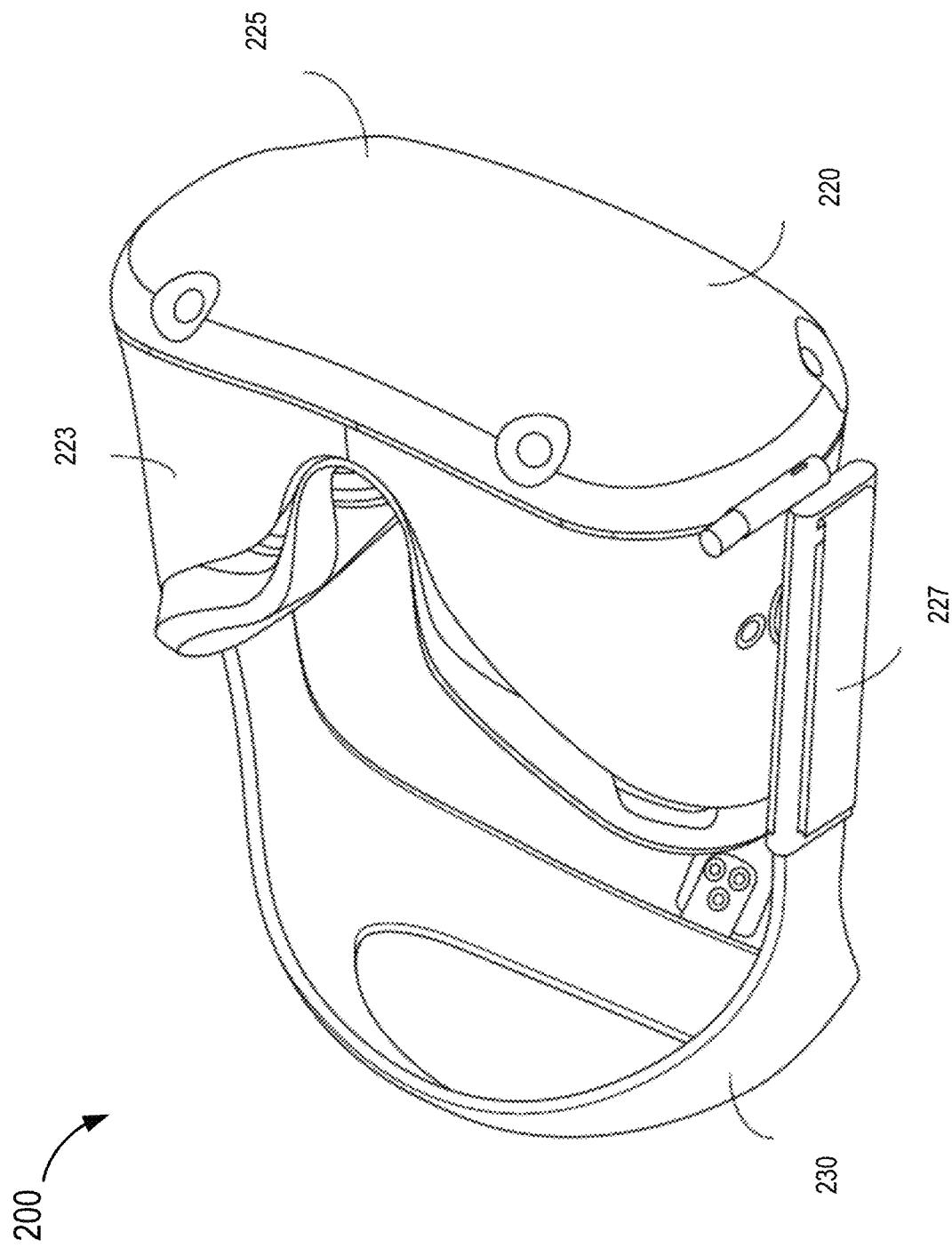
FIG. 2 is a perspective view of an example of a near-eye display system in the form of a head-mounted display (HMD) device for implementing some of the examples disclosed herein.

FIG. 2 is a perspective view of an example of a near-eye display in the form of an HMD device 200 for implementing some of the examples disclosed herein. HMD device 200 may be a part of, e.g., a VR system, an AR system, an MR system, or any combination thereof. HMD device 200 may include a body 220 and a head strap 230. FIG. 2 shows a bottom side 223, a front side 225, and a left side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temple tips as shown in, for example, FIG. 3 below, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audio, or any combination thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, an LCD, an OLED display, an ILED display, a μLED display, an AMOLED, a TOLED, some other display, or any combination thereof. HMD device 200 may include two eyebox regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or any combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
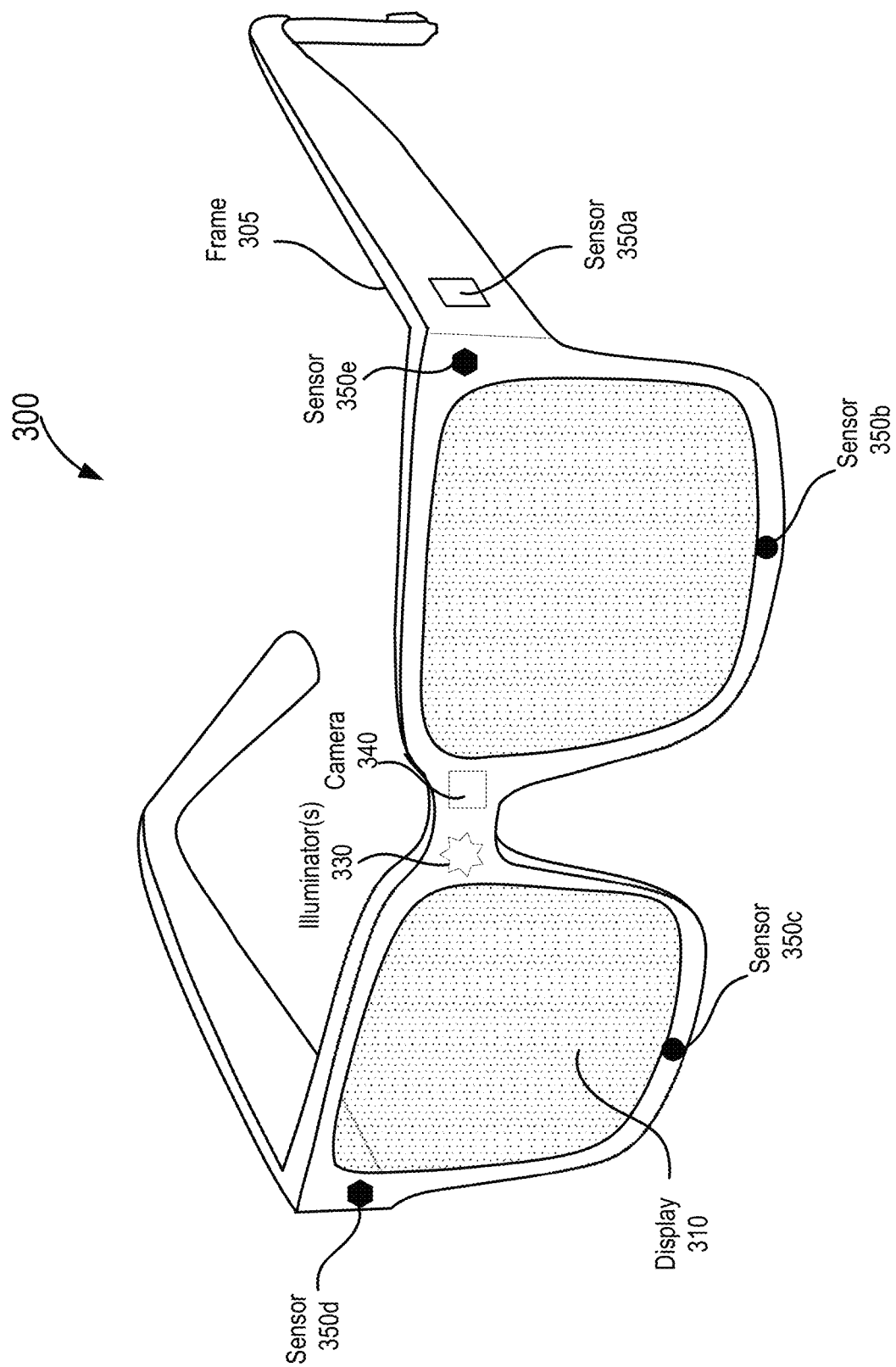
FIG. 3 is a perspective view of an example of a near-eye display system in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display 120 of FIG. 1, display 310 may include an LCD display panel, an LED display panel, or an optical display panel (e.g., a waveguide display assembly).

Near-eye display 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different regions in a field of views in different directions. In some embodiments, sensors 350a-350e may be used as input devices to control or influence the displayed content of near-eye display 300, and/or to provide an interactive VR/AR/MR experience to a user of near-eye display 300. In some embodiments, sensors 350a-350e may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
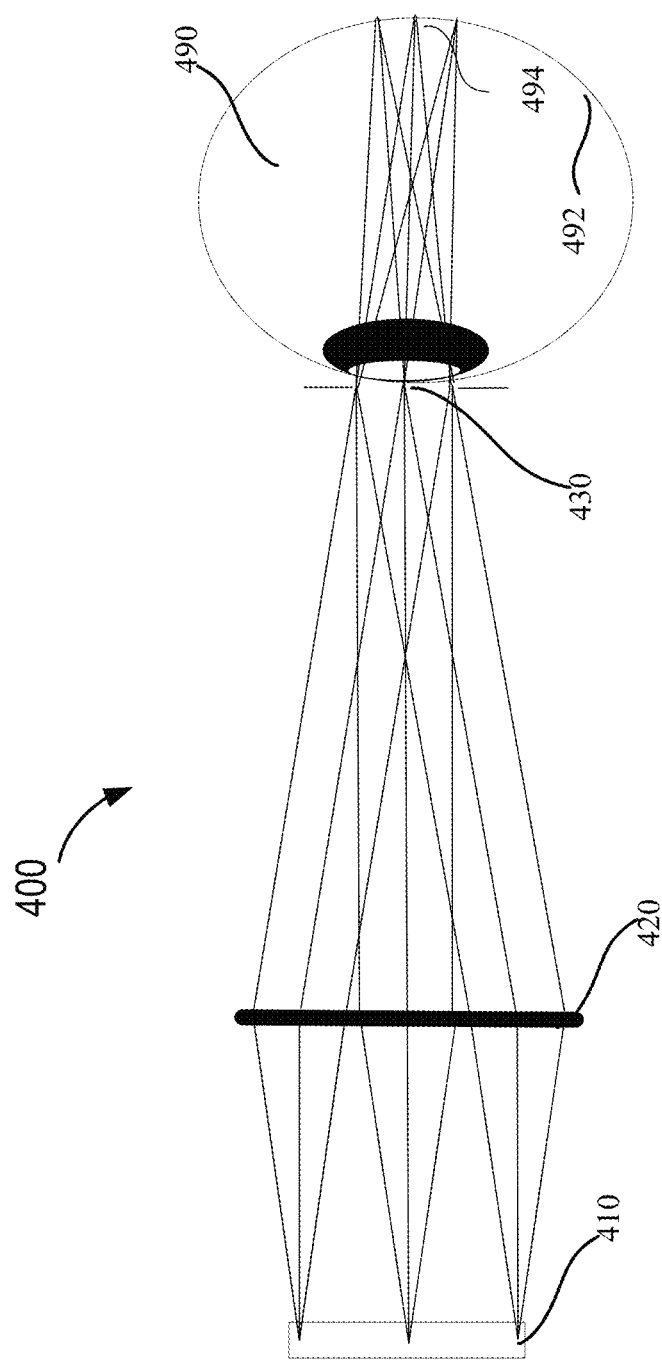
FIG. 4 is a simplified diagram illustrating an example of an optical system in a near-eye display system.

FIG. 4 is a simplified diagram illustrating an example of an optical system 400 in a near-eye display system. Optical system 400 may include an image source 410 and projector optics 420. In the example shown in FIG. 4, image source 410 is in front of projector optics 420. In various embodiments, image source 410 may be located outside of the field of view of user's eye 490. For example, one or more reflectors or directional couplers may be used to deflect light from an image source that is outside of the field of view of user's eye 490 to make the image source appear to be at the location of image source 410 shown in FIG. 4. Light from an area (e.g., a pixel or a light emitting device) on image source 410 may be collimated and directed to an exit pupil 430 by projector optics 420. Thus, objects at different spatial locations on image source 410 may appear to be objects far away from user's eye 490 in different viewing angles (FOVs). The collimated light from different viewing angles may then be focused by the lens of user's eye 490 onto different locations on retina 492 of user's eye 490. For example, at least some portions of the light may be focused on a fovea 494 on retina 492. Collimated light rays from an area on image source 410 and incident on user's eye 490 from a same direction may be focused onto a same location on retina 492. As such, a single image of image source 410 may be formed on retina 492.

The user experience of using an artificial reality system may depend on several characteristics of the optical system, including field of view (FOV), image quality (e.g., angular resolution), size of the eyebox (to accommodate for eye and head movements), and brightness of the light (or contrast) within the eyebox. Field of view describes the angular range of the image as seen by the user, usually measured in degrees as observed by one eye (for a monocular HMD) or both eyes (for either biocular or binocular HMDs). The human visual system may have a total binocular FOV of about 200° (horizontal) by 130° (vertical). To create a fully immersive visual environment, a large FOV is desirable because a large FOV (e.g., greater than about 60°) may provide a sense of "being in" an image, rather than merely viewing the image. Smaller fields of view may also preclude some important visual information. For example, an HMD system with a small FOV may use a gesture interface, but the users may not see their hands in the small FOV to be sure that they are using the correct motions. On the other hand, wider fields of view may require larger displays or optical systems, which may influence the size, weight, cost, and comfort of using the HMD.

Resolution may refer to the angular size of a displayed pixel or image element appearing to a user, or the ability for the user to view and correctly interpret an object as imaged by a pixel and/or other pixels. The resolution of an HMD may be specified as the number of pixels on the image source for a given FOV value, from which an angular resolution may be determined by dividing the FOV in one direction by the number of pixels in the same direction on the image source. For example, for a horizontal FOV of 40° and 1080 pixels in the horizontal direction on the image source, the corresponding angular resolution may be about 2.2 arc-minutes, compared with the one-arc-minute resolution associated with Snellen 20/20 human visual acuity.

In some cases, the eyebox may be a two-dimensional box in front of the user's eye, from which the displayed image from the image source may be viewed. If the pupil of the user moves outside of the eyebox, the displayed image may not be seen by the user. For example, in a non-pupil-forming configuration, there exists a viewing eyebox within which there will be unvignetted viewing of the HMD image source, and the displayed image may vignette or may be clipped but may still be viewable when the pupil of user's eye is outside of the viewing eyebox. In a pupil-forming configuration, the image may not be viewable outside the exit pupil.

The fovea of a human eye, where the highest resolution may be achieved on the retina, may correspond to an FOV of about 2° to about 3°. This may require that the eye rotates in order to view off-axis objects with a highest resolution. The rotation of the eye to view the off-axis objects may introduce a translation of the pupil because the eye rotates around a point that is about 10 mm behind the pupil. In addition, a user may not always be able to accurately position the pupil (e.g., having a radius of about 2.5 mm) of the user's eye at an ideal location in the eyebox. Furthermore, the environment where the HMD is used may require the eyebox to be larger to allow for movement of the user's eye and/or head relative the HMD, for example, when the HMD is used in a moving vehicle or designed to be used while the user is moving on foot. The amount of movement in these situations may depend on how well the HMD is coupled to the user's head.

Thus, the optical system of the HMD may need to provide a sufficiently large exit pupil or viewing eyebox for viewing the full FOV with full resolution, in order to accommodate the movements of the user's pupil relative to the HMD. For example, in a pupil-forming configuration, a minimum size of 12 mm to 15 mm may be desired for the exit pupil. If the eyebox is too small, minor misalignments between the eye and the HMD may result in at least partial loss of the image, and the user experience may be substantially impaired. In general, the lateral extent of the eyebox is more critical than the vertical extent of the eyebox. This may be in part due to the significant variances in eye separation distance between users, and the fact that misalignments to eyewear tend to more frequently occur in the lateral dimension and users tend to more frequently adjust their gaze left and right, and with greater amplitude, than adjusting the gaze up and down. Thus, techniques that can increase the lateral dimension of the eyebox may substantially improve a user's experience with an HMD. On the other hand, the larger the eyebox, the larger the optics and the heavier and bulkier the near-eye display device may be.

In order to view the displayed image against a bright background, the image source of an AR HMD may need to be sufficiently bright, and the optical system may need to be efficient to provide a bright image to the user's eye such that the displayed image may be visible in a background including strong ambient light, such as sunlight. The optical system of an HMD may be designed to concentrate light in the eyebox. When the eyebox is large, an image source with high power may be used to provide a bright image viewable within the large eyebox. Thus, there may be trade-offs among the size of the eyebox, cost, brightness, optical complexity, image quality, and size and weight of the optical system.

Figure 5:
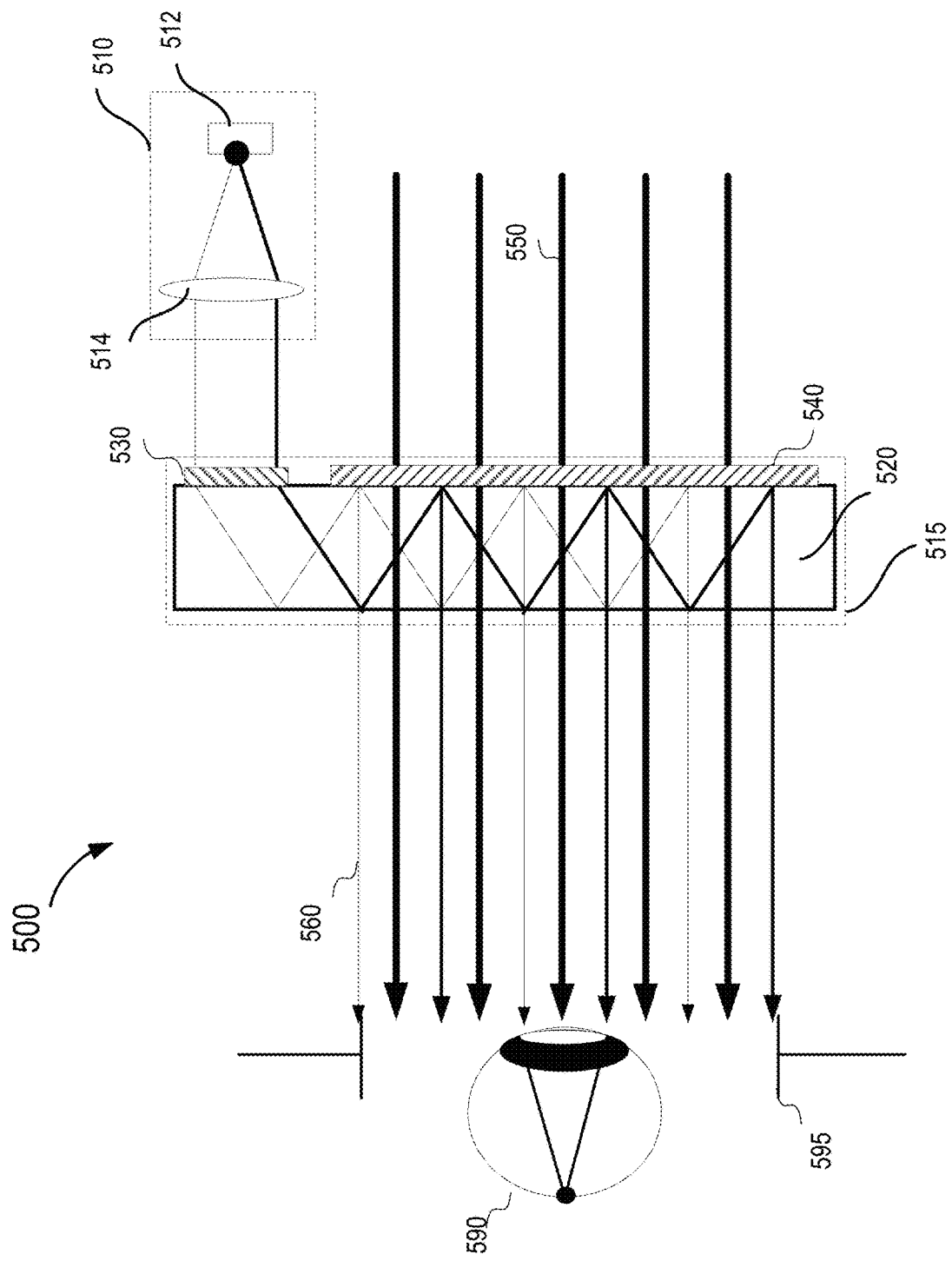
FIG. 5 illustrates an example of an optical see-through augmented reality system including a waveguide display for exit pupil expansion according to certain embodiments.

FIG. 5 illustrates an example of an optical see-through augmented reality system 500 including a waveguide display for exit pupil expansion according to certain embodiments. Augmented reality system 500 may include a projector 510 and a combiner 515. Projector 510 may include a light source or image source 512 and projector optics 514. In some embodiments, light source or image source 512 may include one or more micro-LED devices. In some embodiments, image source 512 may include a plurality of pixels that displays virtual objects, such as an LCD display panel or an LED display panel. In some embodiments, image source 512 may include a light source that generates coherent or partially coherent light. For example, image source 512 may include a laser diode, a vertical cavity surface emitting laser, an LED, a superluminescent LED (SLED), and/or a micro-LED described above. In some embodiments, image source 512 may include a plurality of light sources (e.g., an array of micro-LEDs described above) each emitting a monochromatic image light corresponding to a primary color (e.g., red, green, or blue). In some embodiments, image source 512 may include three two-dimensional arrays of micro-LEDs, where each two-dimensional array of micro-LEDs may include micro-LEDs configured to emit light of a primary color (e.g., red, green, or blue). In some embodiments, image source 512 may include an optical pattern generator, such as a spatial light modulator. Projector optics 514 may include one or more optical components that can condition the light from image source 512, such as expanding, collimating, scanning, or projecting light from image source 512 to combiner 515. The one or more optical components may include, for example, one or more lenses, liquid lenses, mirrors, free-form optics, apertures, and/or gratings. For example, in some embodiments, image source 512 may include one or more one-dimensional arrays or elongated two-dimensional arrays of micro-LEDs, and projector optics 514 may include one or more one-dimensional scanners (e.g., micro-mirrors or prisms) configured to scan the one-dimensional arrays or elongated two-dimensional arrays of micro-LEDs to generate image frames. In some embodiments, projector optics 514 may include a liquid lens (e.g., a liquid crystal lens) with a plurality of electrodes that allows scanning of the light from image source 512.

Combiner 515 may include an input coupler 530 for coupling light from projector 510 into a substrate 520 of combiner 515. Input coupler 530 may include a volume holographic grating or another diffractive optical element (DOE) (e.g., a surface-relief grating (SRG)), a slanted reflective surface of substrate 520, or a refractive coupler (e.g., a wedge or a prism). For example, input coupler 530 may include a reflective volume Bragg grating or a transmissive volume Bragg grating. Input coupler 530 may have a coupling efficiency of greater than 30%, 50%, 75%, 90%, or higher for visible light. Light coupled into substrate 520 may propagate within substrate 520 through, for example, total internal reflection (TIR). Substrate 520 may be in the form of a lens of a pair of eyeglasses. Substrate 520 may have a flat or a curved surface, and may include one or more types of dielectric materials, such as glass, quartz, plastic, polymer, poly(methyl methacrylate) (PMMA), crystal, ceramic, or the like. A thickness of the substrate may range from, for example, less than about 1 mm to about 10 mm or more. Substrate 520 may be transparent to visible light.

Substrate 520 may include or may be coupled to a plurality of output couplers 540 each configured to extract at least a portion of the light guided by and propagating within substrate 520 from substrate 520, and direct extracted light 560 to an eyebox 595 where an eye 590 of the user of augmented reality system 500 may be located when augmented reality system 500 is in use. The plurality of output couplers 540 may replicate the exit pupil to increase the size of eyebox 595, such that the displayed image may be visible in a larger area. As input coupler 530, output couplers 540 may include grating couplers (e.g., volume holographic gratings or surface-relief gratings), other diffraction optical elements (DOEs), prisms, etc. For example, output couplers 540 may include reflective volume Bragg gratings or transmissive volume Bragg gratings. Output couplers 540 may have different coupling (e.g., diffraction) efficiencies at different locations. Substrate 520 may also allow light 550 from the environment in front of combiner 515 to pass through with little or no loss. Output couplers 540 may also allow light 550 to pass through with little loss. For example, in some implementations, output couplers 540 may have a very low diffraction efficiency for light 550 such that light 550 may be refracted or otherwise pass through output couplers 540 with little loss, and thus may have a higher intensity than extracted light 560. In some implementations, output couplers 540 may have a high diffraction efficiency for light 550 and may diffract light 550 in certain desired directions (i.e., diffraction angles) with little loss. As a result, the user may be able to view combined images of the environment in front of combiner 515 and images of virtual objects projected by projector 510. In some implementations, output couplers 540 may have a high diffraction efficiency for light 550 and may diffract light 550 to certain desired directions (e.g., diffraction angles) with little loss.

In some embodiments, projector 510, input coupler 530, and output coupler 540 may be on any side of substrate 520. Input coupler 530 and output coupler 540 may be reflective gratings (also referred to as reflective gratings) or transmissive gratings (also referred to as transmissive gratings) to couple display light into or out of substrate 520.

Figure 6:
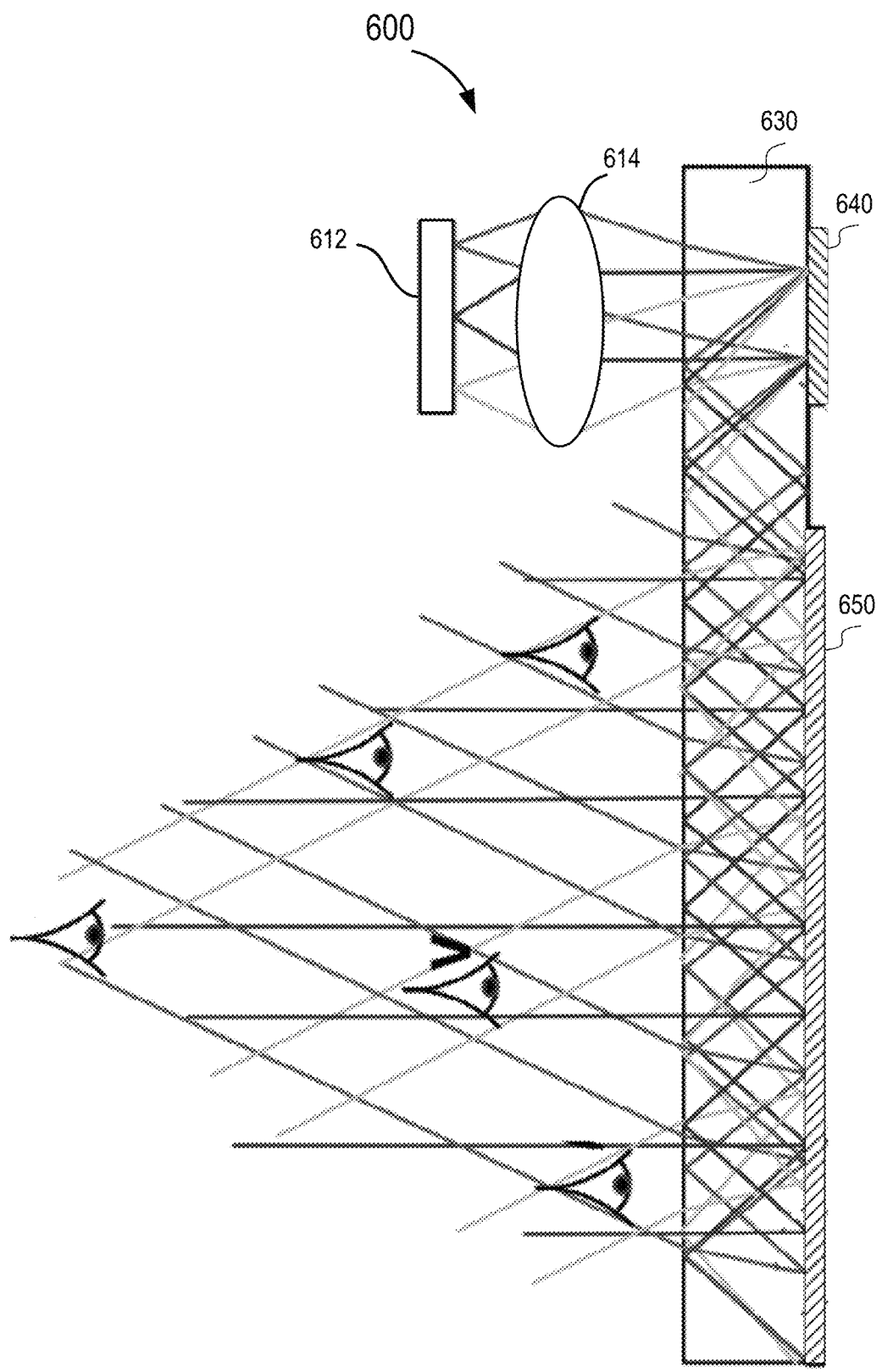
FIG. 6 illustrates an example of an optical see-through augmented reality system including a waveguide display for exit pupil expansion according to certain embodiments.

FIG. 6 illustrates an example of an optical see-through augmented reality system 600 including a waveguide display for exit pupil expansion according to certain embodiments. Augmented reality system 600 may be similar to augmented reality system 500, and may include the waveguide display and a projector that may include a light source or image source 612 and projector optics 614. The waveguide display may include a substrate 630, an input coupler 640, and a plurality of output couplers 650 as described above with respect to augmented reality system 500. While FIG. 5 only shows the propagation of light from a single field of view, FIG. 6 shows the propagation of light from multiple fields of view.

FIG. 6 shows that the exit pupil is replicated by output couplers 650 to form an aggregated exit pupil or eyebox, where different regions in a field of view (e.g., different pixels on image source 612) may be associated with different respective propagation directions towards the eyebox, and light from a same field of view (e.g., a same pixel on image source 612) may have a same propagation direction for the different individual exit pupils. Thus, a single image of image source 612 may be formed by the user's eye located anywhere in the eyebox, where light from different individual exit pupils and propagating in the same direction may be from a same pixel on image source 612 and may be focused onto a same location on the retina of the user's eye. FIG. 6 shows that the image of the image source is visible by the user's eye even if the user's eye moves to different locations in the eyebox.

In many waveguide-based near-eye display systems, in order to expand the eyebox of the waveguide-based near-eye display in two dimensions, two or more output gratings may be used to expand the display light in two dimensions or along two axes (which may be referred to as dual-axis pupil expansion). The two gratings may have different grating parameters, such that one grating may be used to replicate the exit pupil in one direction and the other grating may be used to replicate the exit pupil in another direction.

As described above, the input and output grating couplers described above can be volume holographic gratings or surface-relief gratings, which may have very different Klein-Cook parameter Q:

$$Q = \frac{2\pi\lambda d}{n\Lambda^2},$$

where d is the thickness of the grating, λ is the wavelength of the incident light in free space, Λ is the grating period, and n is the refractive index of the recording medium. The Klein-Cook parameter Q may divide light diffraction by gratings into three regimes. When a grating is characterized by Q<<1, light diffraction by the grating may be referred to as Raman-Nath diffraction, where multiple diffraction orders may occur for normal and/or oblique incident light. When a grating is characterized by Q>>1 (e.g., Q≥10), light diffraction by the grating may be referred to as Bragg diffraction, where generally only the zeroth and the ±1 diffraction orders may occur for light incident on the grating at an angle satisfying the Bragg condition. When a grating is characterized by Q≈1, the diffraction by the grating may be between the Raman-Nath diffraction and the Bragg diffraction. To meet Bragg conditions, the thickness d of the grating may be higher than certain values to occupy a volume (rather than at a surface) of a medium, and thus may be referred to as a volume Bragg grating. VBGs may generally have relatively small refractive index modulations (e.g., Δn≤0.05) and high spectral and angular selectivity, while surface-relief gratings may generally have large refractive index modulations (e.g., Δn≥0.5) and wide spectral and angular bandwidths.

Figure 7A:
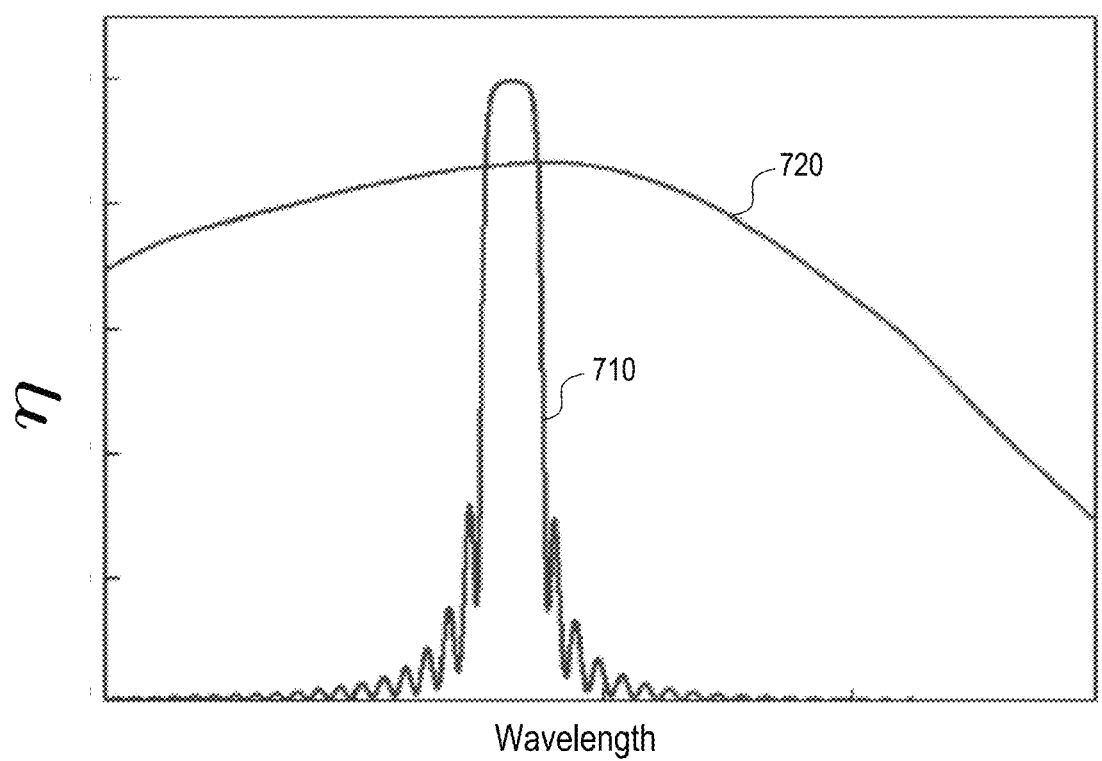
FIG. 7A illustrates the spectral bandwidth of an example of a reflective volume Bragg grating (VBG) and the spectral bandwidth of an example of a transmissive surface-relief grating (SRG).

FIG. 7A illustrates the spectral bandwidth of an example of a volume Bragg grating (e.g., a reflective VBG) and the spectral bandwidth of an example of a surface-relief grating (e.g., a transmissive SRG). The horizontal axis represents the wavelength of the incident visible light and the vertical axis corresponds to the diffraction efficiency. As shown by a curve 710, the diffraction efficiency of the reflective VBG is high in a narrow wavelength range, such as green light. In contrast, the diffraction efficiency of the transmissive SRG may be high in a very wide wavelength range, such as from blue to red light, as shown by a curve 720.

Figure 7B:
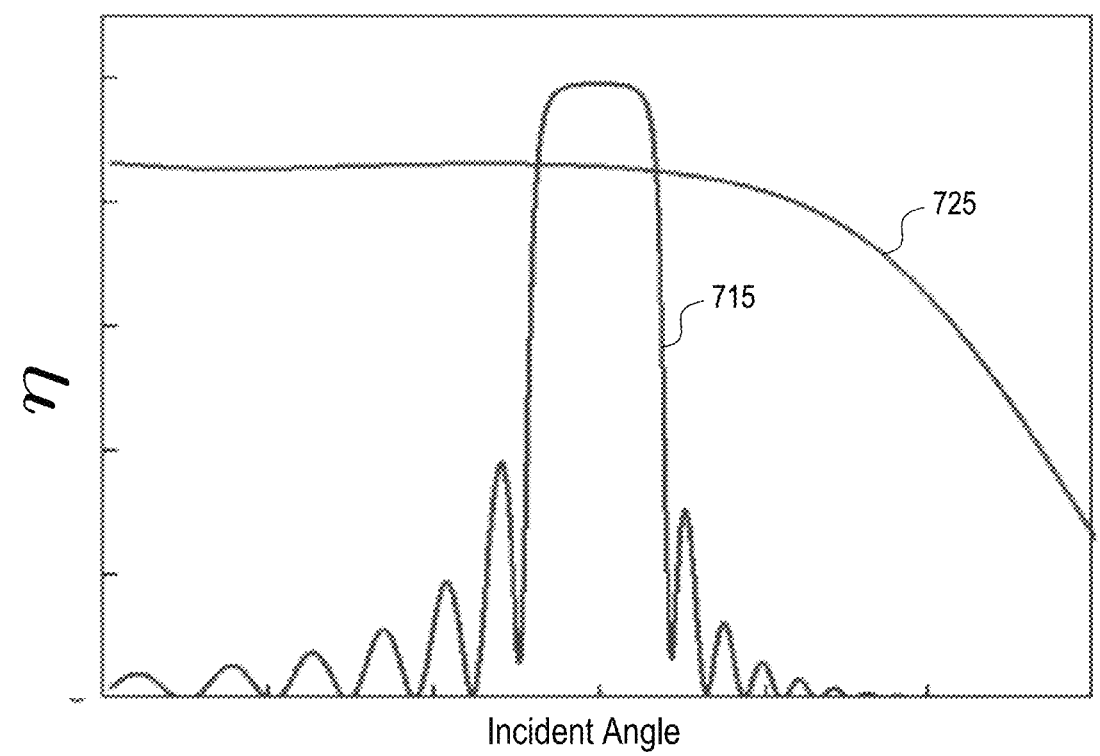
FIG. 7B illustrates the angular bandwidth of an example of a reflective VBG and the angular bandwidth of an example of a transmissive SRG.

FIG. 7B illustrates the angular bandwidth of an example of a volume Bragg grating (e.g., a reflective VBG) and the angular bandwidth of an example of a surface-relief grating (e.g., a transmissive SRG). The horizontal axis represents the incident angle of the visible light incident on the grating, and the vertical axis corresponds to the diffraction efficiency. As shown by a curve 715, the diffraction efficiency of the reflective VBG is high for light incident on the grating from a narrow angular range, such as about ±2.5° from the perfect Bragg condition. In contrast, the diffraction efficiency of the transmissive SRG is high in a very wide angular range, such as greater than about ±10° or wider, as shown by a curve 725.

FIG. 8A illustrates an example of an optical see-through augmented reality system including a waveguide display 800 and surface-relief gratings for exit pupil expansion according to certain embodiments. Waveguide display 800 may include a substrate 810 (e.g., a waveguide), which may be similar to substrate 520. Substrate 810 may be transparent to visible light and may include, for example, a glass, quartz, plastic, polymer, PMMA, ceramic, $Si_3N_4$, or crystal substrate. Substrate 810 may be a flat substrate or a curved substrate. Substrate 810 may include a first surface 812 and a second surface 814. Display light may be coupled into substrate 810 by an input coupler 820, and may be reflected by first surface 812 and second surface 814 through total internal reflection, such that the display light may propagate within substrate 810. Input coupler 820 may include a grating, a refractive coupler (e.g., a wedge or a prism), or a reflective coupler (e.g., a reflective surface having a slant angle with respect to substrate 810). For example, in one embodiment, input coupler 820 may include a prism that may couple display light of different colors into substrate 810 at a same refraction angle. In another example, input coupler 820 may include a grating coupler that may diffract light of different colors into substrate 810 at different directions. Input coupler 820 may have a coupling efficiency of greater than 10%, 20%, 30%, 50%, 75%, 90%, or higher for visible light.

Waveguide display 800 may also include a first output grating 830 and a second output grating 840 positioned on one or two surfaces (e.g., first surface 812 and second surface 814) of substrate 810 for expanding incident display light beam in two dimensions in order to fill an eyebox with the display light. First output grating 830 may be configured to expand at least a portion of the display light beam along one direction, such as approximately in the x direction. Display light coupled into substrate 810 may propagate in a direction shown by a line 832. While the display light propagates within substrate 810 along a direction shown by line 832, a portion of the display light may be diffracted by a region of first output grating 830 towards second output grating 840 as shown by a line 834 each time the display light propagating within substrate 810 reaches first output grating 830. Second output grating 840 may then expand the display light from first output grating 830 in a different direction (e.g., approximately in the y direction) by diffracting a portion of the display light from an exit region 850 to the eyebox each time the display light propagating within substrate 810 reaches second output grating 840.

FIG. 8B illustrates an example of an eye box including two-dimensional replicated exit pupils. FIG. 8B shows that a single input pupil 805 may be replicated by first output grating 830 and second output grating 840 to form an aggregated exit pupil 860 that includes a two-dimensional array of individual exit pupils 862. For example, the exit pupil may be replicated in approximately the x direction by first output grating 830 and in approximately the y direction by second output grating 840. As described above, output light from individual exit pupils 862 and propagating in a same direction may be focused onto a same location in the retina of the user's eye. Thus, a single image may be formed by the user's eye from the output light in the two-dimensional array of individual exit pupils 862.

Figure 9:
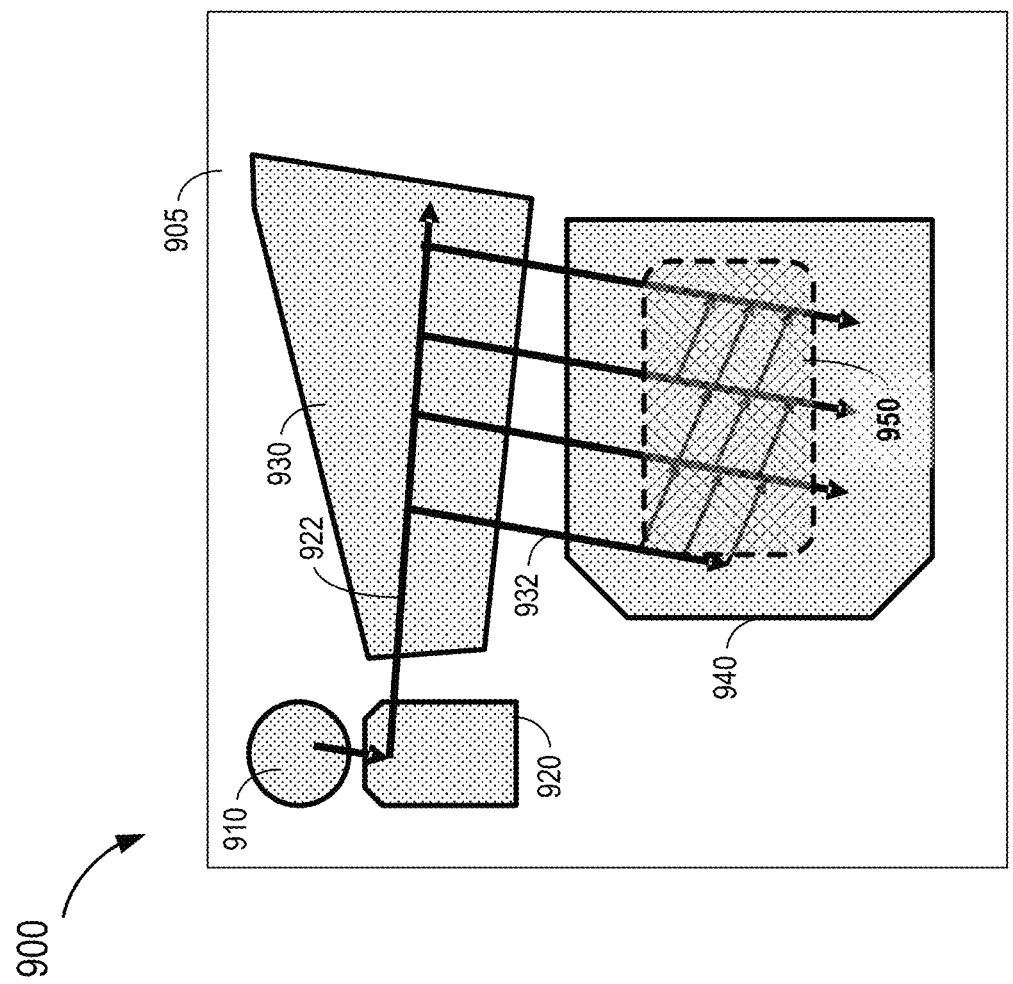
FIG. 9 illustrates an example of a waveguide display including grating couplers for exit pupil expansion according to certain embodiments.

FIG. 9 illustrates an example of a volume Bragg grating-based waveguide display 900 with exit pupil expansion and dispersion reduction according to certain embodiments. Waveguide display 900 may be an example of waveguide display 800. Waveguide display 900 may include a waveguide 905, and an input grating 910, a first middle grating 920, a second middle grating 930, and an output grating 940 formed on or in waveguide 905. Each of input grating 910, first middle grating 920, second middle grating 930, and output grating 940 may be a multiplexed transmissive grating or a multiplexed reflective grating. Display light from a light source (e.g., one or more micro-LED arrays) may be coupled into waveguide 905 by input grating 910. The in-coupled display light may be reflected by surfaces of waveguide 905 through total internal reflection, such that the display light may propagate within waveguide 905. Input grating 910 may include multiplexed VBGs and may couple display light of different colors and from different fields of view into waveguide 905 at corresponding diffraction angles.

First middle grating 920 and second middle grating 930 may be in different regions of a same holographic material layer or may be on different holographic material layers. In some embodiments, first middle grating 920 may be spatially separate from second middle grating 930. First middle grating 920 and second middle grating 930 may each include multiplexed VBGs. In some embodiments, first middle grating 920 and second middle grating 930 may be recorded in a same number of exposures and under similar recording conditions, such that each VBG in first middle grating 920 may match a respective VBG in second middle grating 930 (e.g., having the same grating vector in the x-y plane and having the same and/or opposite grating vectors in the z direction). For example, in some embodiments, a VBG in first middle grating 920 and a corresponding VBG in second middle grating 930 may have the same grating period and grating tilt angle (and thus the same grating vector), and the same thickness. In one example, first middle grating 920 and second middle grating 930 may have a thickness about 20 μm and may each include about 20 or more VBGs recorded through about 20 or more exposures.

Output grating 940 may be formed in the see-through region of waveguide display 900 and may include an exit region 950 that overlaps with the eyebox of waveguide display 900 when viewed in the z direction (e.g., at a distance about 15-20 mm from output grating 940 in +z or −z direction). Output grating 940 may include multiplexed VBG gratings that include many VBGs. In some embodiments, output grating 940 may include transmissive gratings and may at least partially overlap with second middle grating 930 in the x-y plane, thereby reducing the form factor of waveguide display 900 without causing FOV clipping. Output grating 940, in combination with first middle grating 920 and second middle grating 930, may perform the dual-axis pupil expansion described above to expand the incident display light beam in two dimensions to fill the eyebox with the display light.

Input grating 910 may couple the display light from the light source into waveguide 905. The display light may reach first middle grating 920 directly or may be reflected by surfaces of waveguide 905 to first middle grating 920. Each VBG in first middle grating 920 may diffract a portion of the display light within a FOV and wavelength range that approximately satisfies the Bragg condition of the VBG to second middle grating 930. While the display light diffracted by a VBG in first middle grating 920 propagates within waveguide 905 (e.g., along a direction shown by a line 922) through total internal reflection, a portion of the display light may be diffracted by the corresponding VBG in second middle grating 930 towards output grating 940 each time the display light propagating within waveguide 905 reaches second middle grating 930. Output grating 940 may then expand the display light from second middle grating 930 in a different direction by diffracting a portion of the display light to the eyebox each time the display light propagating within waveguide 905 reaches exit region 950 of output grating 940.

As described above, each VBG in first middle grating 920 may match a respective VBG in second middle grating 930 (e.g., having the same grating vector in the x-y plane and having the same and/or opposite grating vector in the z direction). The two matching VBGs may operate under opposite Bragg conditions (e.g., +1 order diffraction versus −1 order diffraction) due to the opposite propagation directions of the display light at the two matching VBGs. For example, as shown in FIG. 9, the VBG in first middle grating 920 may change the propagation direction of the display light from a downward direction to a rightward direction, while the matching VBG in second middle grating 930 may change the propagation direction of the display light from a rightward direction to a downward direction. Thus, the dispersion caused by second middle grating 930 may be opposite to the dispersion caused by first middle grating 920, thereby reducing or minimizing the overall dispersion.

Similarly, each VBG in input grating 910 may match a respective VBG in output grating 940 (e.g., having the same grating vector in the x-y plane and having the same and/or opposite grating vector in the z direction). The two matching VBGs may also operate under opposite Bragg conditions (e.g., +1 order diffraction versus −1 order diffraction) due to the opposite propagation directions of the display light (e.g., into and out of waveguide 905) at the two matching VBGs. Therefore, the dispersion caused by input grating 910 may be opposite to the dispersion caused by output grating 940, thereby reducing or minimizing the overall dispersion.

Due to the limited wavelength range and angular range of each VBG grating as described above with respect to, for example, FIGS. 7A and 7B, different VBGs may need to be used to diffract different color components of the display light and/or display light from different fields of view. To cover a large field of view for all colors, many VBGs may be needed. However, the maximum achievable total refractive index modulation of a holographic material layer may be limited. Therefore, when many VBGs are recorded in a holographic material layer, the refractive index modulation of each VBG may be low and thus the diffraction efficiency of each VBG may be low. Furthermore, gratings already recorded in a holographic material layer may diffract the recording light and thus may affect the subsequently recorded gratings. In addition, the gratings may become hazy when many VBGs are recorded in the same holographic material layer. Therefore, limited number of VBGs may be recorded in the holographic material layer, and the overall diffraction efficiency of the VBG-based waveguide display may be low and/or the field of view of the VBG-based waveguide display may be small. As such, multiple holographic material layers may be needed to cover the entire field of view for all colors.

Figure 10:
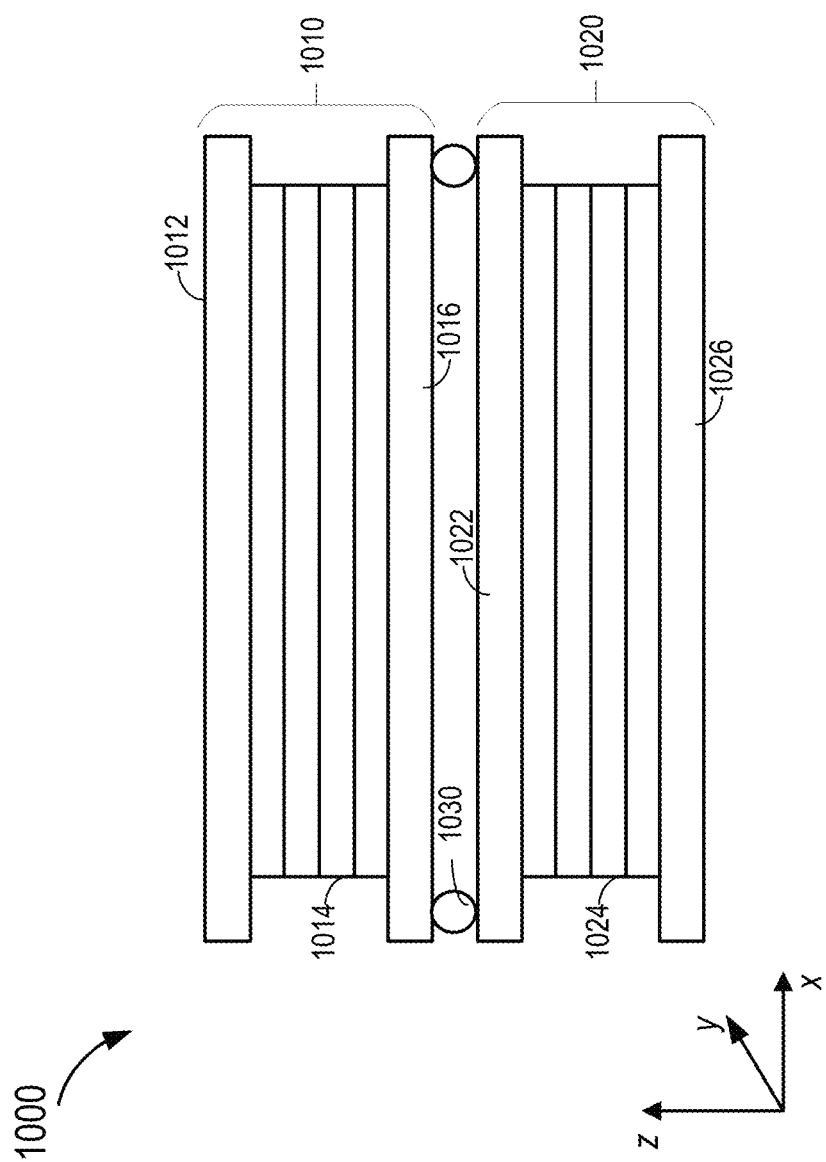
FIG. 10 illustrates an example of a waveguide display including VBG couplers in multiple grating layers according to certain embodiments.

FIG. 10 illustrates an example of a waveguide display 1000 including volume Bragg gratings according to certain embodiments. In the illustrated example, waveguide display 1000 may include a first waveguide assembly 1010 and a second waveguide assembly 1020 that are separated by a spacer 1030 and an air gap. First waveguide assembly 1010 may include a first substrate 1012, a second substrate 1016, and one or more holographic grating layers 1014 between first substrate 1012 and second substrate 1016. First substrate 1012, second substrate 1016, and holographic grating layers 1014 may form a waveguide. First substrate 1012 and second substrate 1016 may each be a thin transparent substrate, such as a glass substrate having a thickness, for example, about 100 µm or a few hundred micrometers. Holographic grating layers 1014 may include multiplexed reflective VBGs, transmissive VBGs, or both. VBGs in each of holographic grating layers 1014 may be configured to diffract display light from certain FOV and wavelength ranges. Similarly, second waveguide assembly 1020 may include a first substrate 1022, a second substrate 1026, and one or more holographic grating layers 1024 between first substrate 1022 and second substrate 1026. Holographic grating layers 1024 may include multiplexed reflective VBGs, transmissive VBGs, or both. VBGs in each of holographic grating layers 1024 may be configured to diffract display light from certain fields of view and/or in certain colors. For example, first waveguide assembly 1010 may be used to couple display light in red, green, and blue colors from certain fields of view to user's eyes, and second waveguide assembly 1020 may be used to couple display light in red, green, and blue colors from other fields of view to user's eyes.

Each of first waveguide assembly 1010 and second waveguide assembly 1020 may include a set of gratings configured to perform the dual-axis pupil expansion described above to replicate the incident display light beam from certain fields of view in two dimensions to fill the eyebox with the display light. For example, the respective set of gratings in first waveguide assembly 1010 or second waveguide assembly 1020 may include an input grating (e.g., input grating 910), a first middle grating (e.g., first middle grating 920), a second middle grating (e.g., second middle grating 930), and an output grating (e.g., output grating 940).

As illustrated in FIG. 10, each of first waveguide assembly 1010 and second waveguide assembly 1020 may include multiple polymer layers on one or more substrates, where the input grating, the first middle grating, the second middle grating, and the output grating may each be split into multiple gratings recorded in the multiple polymer layers. The gratings on each polymer layer may cover different respective FOV and wavelength range, and the combination of the multiple polymer layers may provide the full FOV and wavelength coverage. In this way, each polymer layer can be thin (e.g., about 20 µm to about 100 µm), and can be exposed for fewer times (e.g., less than about 100, less than about 50, or less than about 20 times) to record fewer gratings to reduce interference and haziness and increase the refractive index modulation for each VBG grating. Therefore, the diffraction efficiency of each VBG grating can be high for the covered FOV and wavelength range, and the overall diffraction efficiency of waveguide display 1000 can be high for the entire FOV and wavelength range due to the multiple polymer layers used.

As illustrated, first waveguide assembly 1010 and second waveguide assembly 1020 may be positioned in different z locations and may be aligned in the x and y directions. The input grating of first waveguide assembly 1010 may couple a portion of the display light (e.g., for certain FOV and wavelength ranges) from a projector into first waveguide assembly 1010. The coupled display light may reach the first middle grating of first waveguide assembly 1010 directly or may be reflected by surfaces of first waveguide assembly 1010 to the first middle grating. Each VBG in the first middle grating may diffract a portion of the display light within a FOV and wavelength range that approximately satisfies the Bragg condition of the VBG to the second middle grating of first waveguide assembly 1010. While the display light diffracted by a VBG in the first middle grating propagates within first waveguide assembly 1010 through total internal reflection, a portion of the display light may be diffracted by the corresponding VBG in the second middle grating towards the output grating of first waveguide assembly 1010 each time the display light propagating within first waveguide assembly 1010 reaches the second middle grating. The output grating may then expand the display light from the second middle grating in a different direction by diffracting a portion of the display light to an eyebox each time the display light propagating within first waveguide assembly 1010 reaches the output grating. Thus, the output grating, in combination with the first middle grating and the second middle grating, may perform the dual-axis pupil expansion described above to expand the incident display light from certain FOV and wavelength ranges in two dimensions to fill the eyebox with the display light.

The portion of the display light that is not diffracted by the input grating of first waveguide assembly 1010 (e.g., display light for other FOV/wavelength ranges) may pass through first waveguide assembly 1010 and reach second waveguide assembly 1020. The input grating of second waveguide assembly 1020 may couple the display light into second waveguide assembly 1020. As described above, the display light coupled into second waveguide assembly 1020 may reach the first middle grating of second waveguide assembly 1020 and may be diffracted by the first middle grating to change the propagation direction and reach the second middle grating of second waveguide assembly 1020, which may diffract the display light towards the output grating of second waveguide assembly 1020. The output grating may then couple the display light out of second waveguide assembly 1020 towards the eyebox of waveguide display 1000.

As described above, each of the input grating, first middle grating, second middle grating, and output grating may be a multiplexed VBG that includes multiple VBGs, where each VBG may be designed for a specific FOV and wavelength range and may be recorded under a different recording condition. The FOV and wavelength coverage by the multiplexed VBG may depend on the number of different VBGs in the multiplexed VBG. When a multiplexed VBG is recorded by a small number of exposures (i.e., a small number of gratings in the multiplexed VBG), the multiplexed VBG may not be able to cover the full FOV and visible wavelength range, and thus some light information (in some FOV and wavelength ranges) may be lost. When a multiplexed VBG is recorded by a large number of exposures (i.e., a large number of gratings in the multiplexed VBG), the FOV and wavelength coverage of the VBGs may at least partially overlap and thus may cause crosstalk between the VBGs.

Figure 11A:
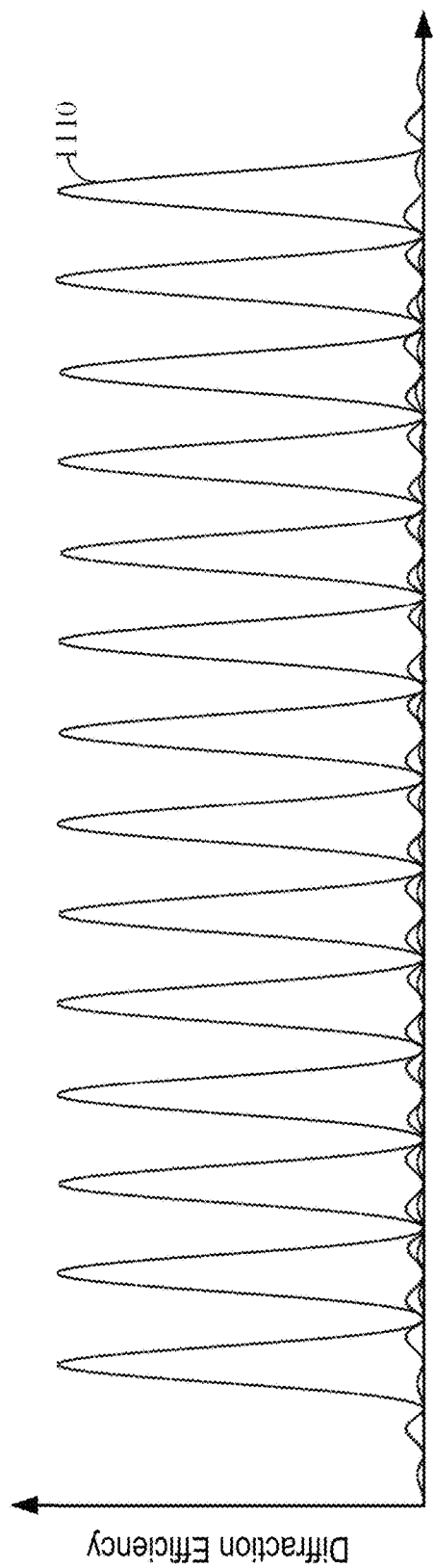
FIG. 11A illustrates the diffraction efficiency of an example of a multiplexed VBG as a function of the field of view of the incident light according to certain embodiments.

FIG. 11A illustrates the diffraction efficiency of an example of a multiplexed VBG as a function of the field of view of incident light according to certain embodiments. Each curve 1110 may represent the diffraction efficiency of a respective VBG and may be a sinc function of the field of view. As described above, the full-width-half-maximum (FWHM) wavelength range and the FWHM angle range of a VBG near the Bragg condition may be limited. Thus, a small number of VBGs in the multiplexed VBG may not cover the entire FOV and wavelength range of the waveguide display. For example, as shown by the example illustrated in FIG. 11A, about half of the display light may not be diffracted by the multiplexed VBG.

Figure 11B:
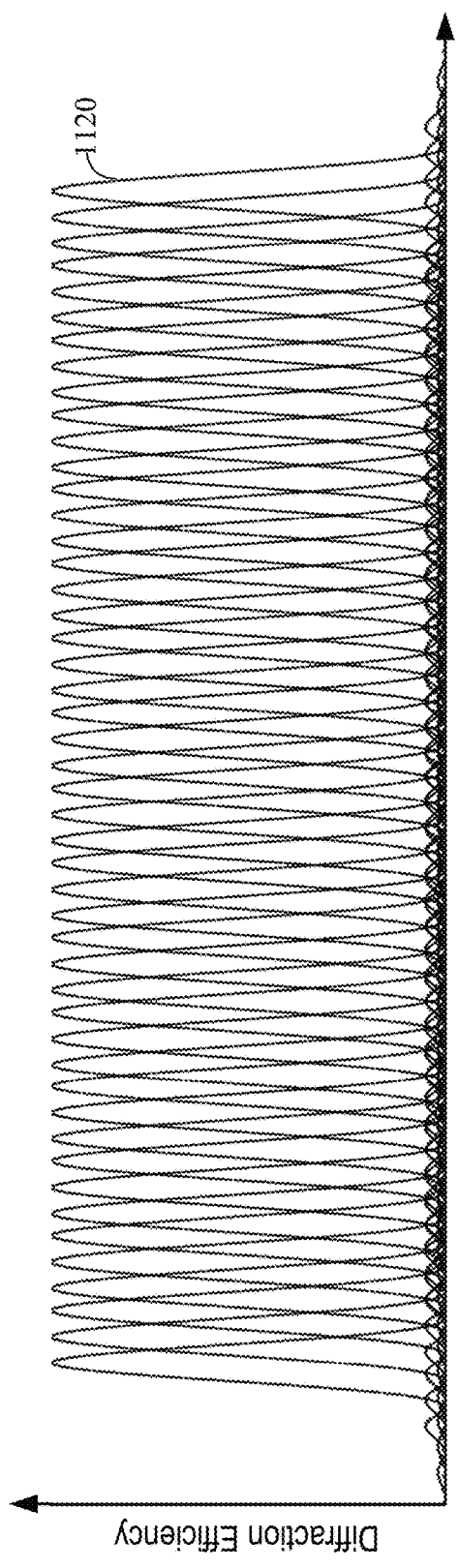
FIG. 11B illustrates the diffraction efficiency of another example of a multiplexed VBG as a function of the field of view of the incident light according to certain embodiments.

FIG. 11B illustrates the diffraction efficiency of another example of a multiplexed VBG as a function of the field of view of incident light according to certain embodiments. Each curve 1120 may represent the diffraction efficiency of a respective VBG and may be a sinc function of the wavelength of the display light. Because the FWHM wavelength range and the FWHM angle range of a VBG near the Bragg condition may be limited, a large number of VBGs may be needed to cover a large FOV (e.g., greater than ±30° and the full visible spectrum (e.g., from about 440 nm to about 650 nm). However, the FOV coverage of the VBGs may at least partially overlap and thus may cause crosstalk between the VBGs. For example, display light from a FOV range that is designed to be diffracted by one VBG may be at least partially diffracted by a different VBG designed to diffract display light from a different FOV range.

Figure 12:
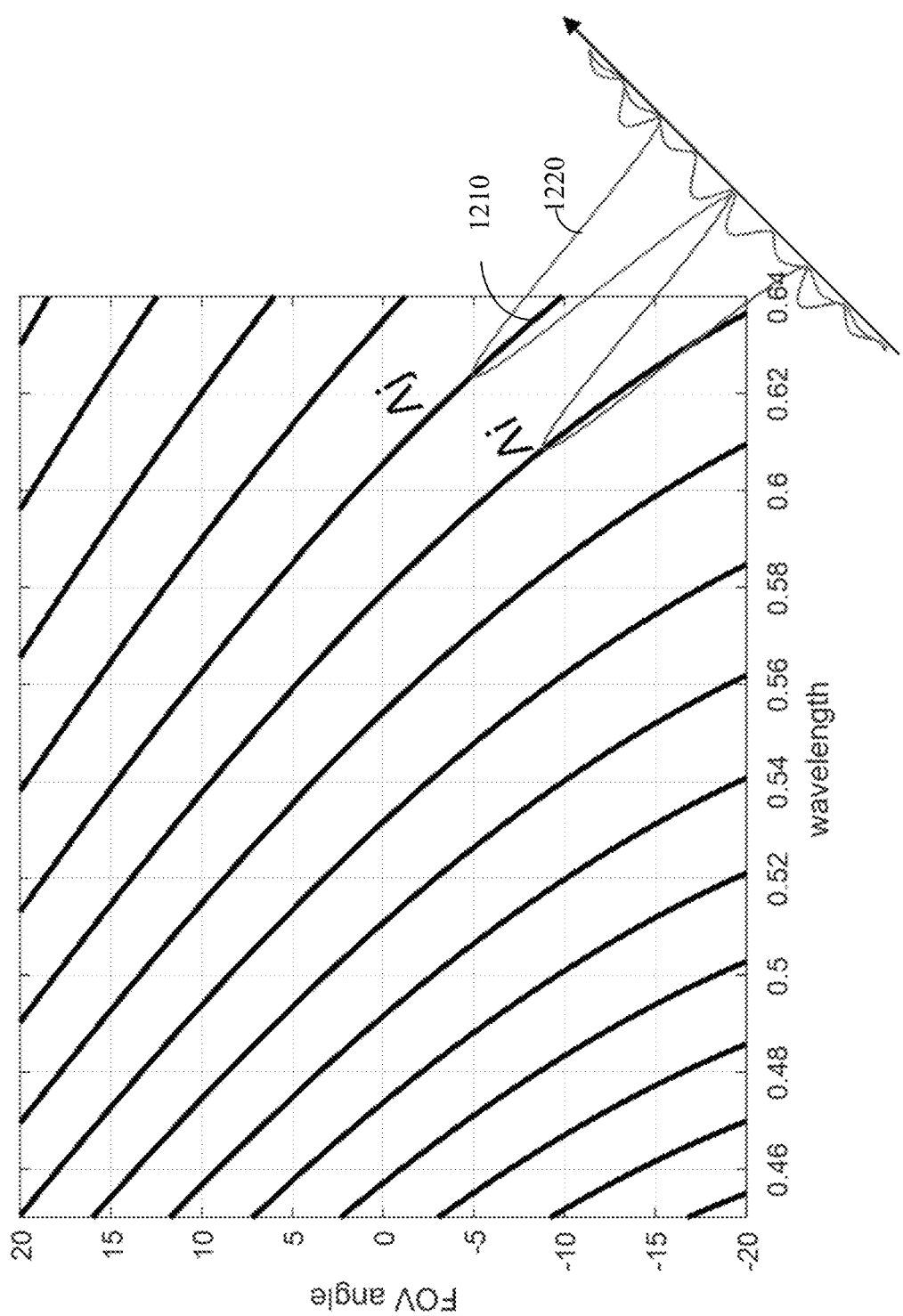
FIG. 12 illustrates field of view (FOV) and wavelength ranges covered by an example of a VBG-based waveguide display.

FIG. 12 illustrates field-of-view and wavelength ranges covered by an example of a VBG-based waveguide display. Each line 1210 in FIG. 12 may correspond to a VBG with a grating period $\Lambda_i$, and may indicate the field of view and wavelength coverage of the VBG. A curve 1220 in FIG. 12 shows the range of the field of view and wavelength covered by a VBG and the diffraction efficiency of the VBG for the range. In the illustrated example, the difference between the grating parameters of two VBGs corresponding to two adjacent lines 1210 may be large, the field-of-view and wavelength coverage of the two VBGs may not have any overlap, and thus there may be some FOV and wavelength ranges not covered by the VBGs in the VBG-based waveguide display. It may generally be desirable to multiplex more gratings in a multiplexed VBG to cover the entire FOV and wavelength range and to increase the diffraction efficiency of light for a large FOV and wavelength range. However, crosstalk may occur between gratings when gratings with overlapping FOV and wavelength coverage are multiplexed in the multiplexed VBG.

Figure 13:
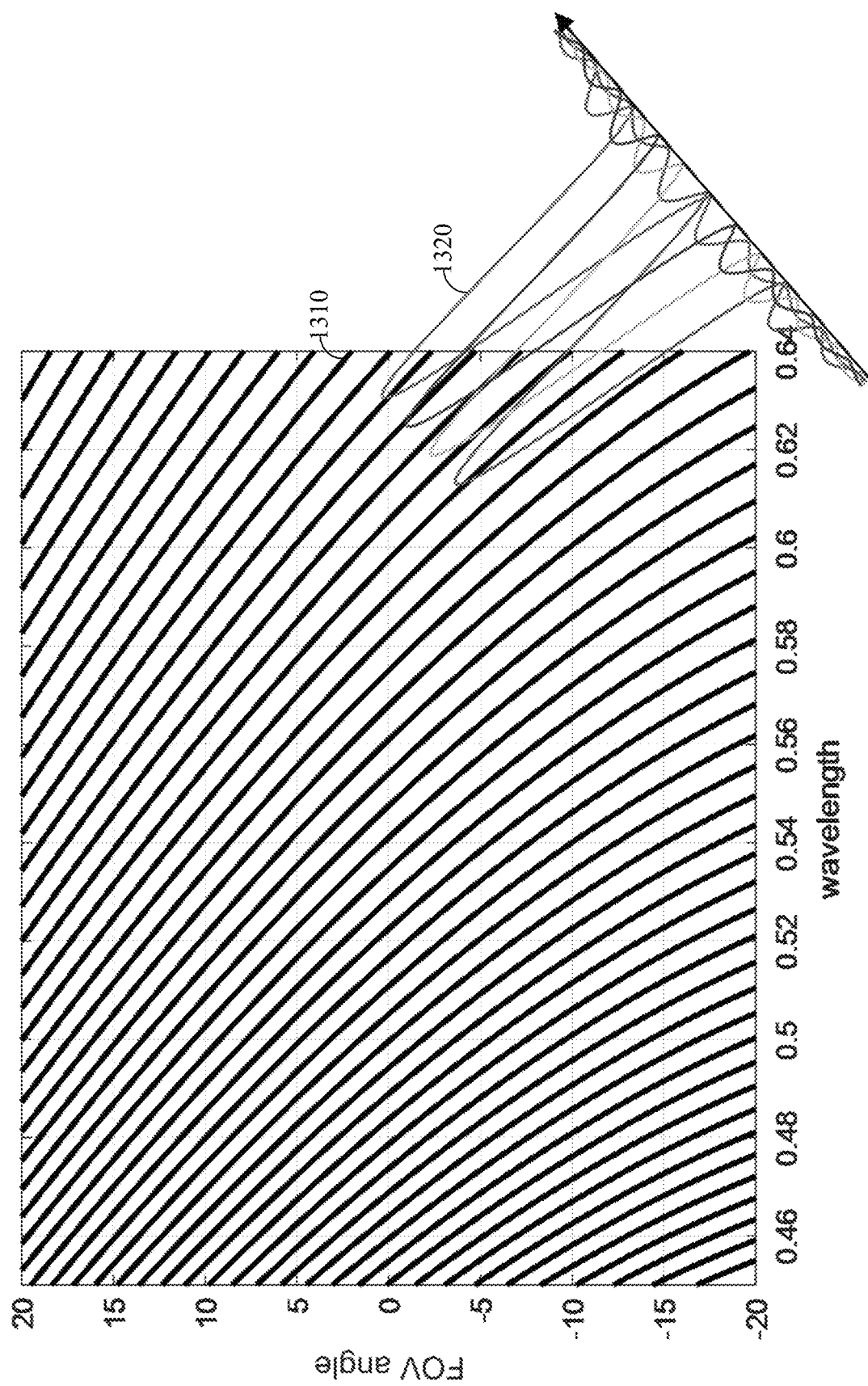
FIG. 13 illustrates FOV and wavelength ranges covered by another example of a VBG-based waveguide display.

FIG. 13 illustrates the field-of-view and wavelength range covered by an example of a VBG-based waveguide display. Each line 1310 in FIG. 13 may indicate the FOV and wavelength coverage of a VBG. A curve 1320 in FIG. 13 shows the range of the field of view and wavelength covered by a VBG and the diffraction efficiency of the VBG for the range. In the illustrated example, the difference between the grating parameters of two VBGs corresponding to two adjacent lines 1310 may be small. Thus, the FOV and wavelength coverage of the two VBGs may at least partially overlap, and hence there may be some FOV and wavelength ranges covered by both VBGs. As such, crosstalk may occur between the VBGs, which may cause ghost images due to undesired diffraction by gratings having similar FOV and wavelength coverage.

Figure 14:
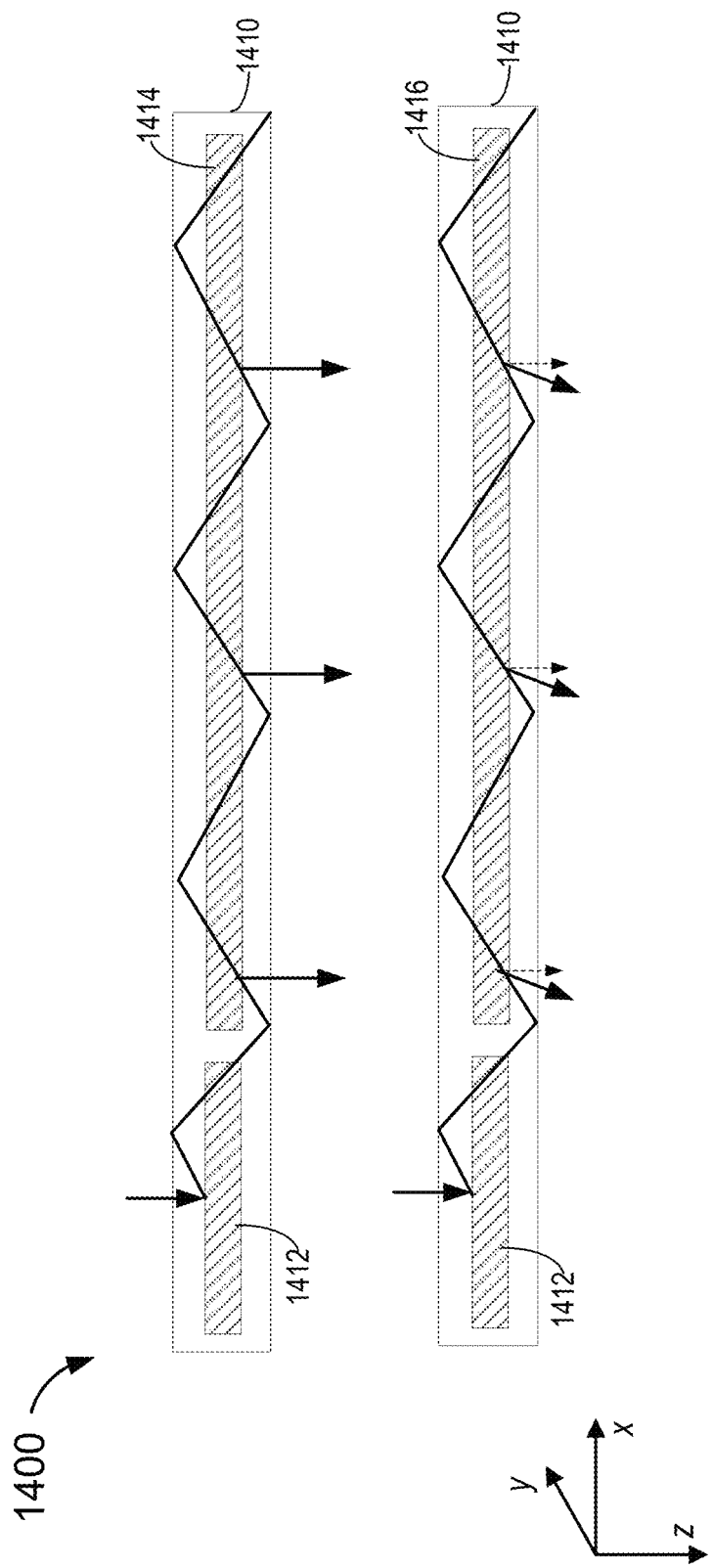
FIG. 14 illustrates an example of crosstalk between multiplexed volume Bragg gratings in an example of a waveguide display.

FIG. 14 illustrates an example of crosstalk between multiplexed volume Bragg gratings in an example of a waveguide display 1400. Waveguide display 1400 may include an input grating 1412 and an output grating in a waveguide 1410. Input grating 1412 and the output grating may both be multiplexed gratings. In the illustrated example, the output grating may include two or more output gratings, such as a first output grating 1414 and a second output grating 1416, that may be recorded in a same grating layer or multiple grating layers. Display light in a first FOV and wavelength range may be coupled into waveguide 1410 by a VBG in input grating 1412, and may be coupled by first output grating 1414 out of waveguide 1410 at a first angle, such as at an output angle equal to the input angle (e.g., about 90° in the illustrated example). Display light in the first color and for a second field of view may be coupled into waveguide 1410 by another VBG in input grating 1412, and may be coupled by second output grating 1416 out of waveguide 1410 at a second angle.

In some cases, ghost effects may be caused by undesired diffraction of display light for a first field of view by a grating designed for a different field of view. In the example shown in FIG. 14, first output grating 1414 and second output grating 1416 may be designed to cover adjacent fields of view. The FOV covered by second output grating 1416 may at least partially overlap with the first FOV associated with first output grating 1414 as described above. Therefore, the display light from the first field of view and coupled into waveguide 1410 by input grating 1412 may be at least partially coupled out of waveguide 1416 by second output grating 1416 to an undesired direction. Thus, a ghost image may be generated. If second output grating 1416 and first output grating 1414 have the same grating period, second output grating 1416 may diffract the display light from the first field of view to the desired direction and thus no ghost images may be generated.

In some embodiments, to reduce crosstalk between first output grating 1414 and second output grating 1416, a waveguide display with multiple waveguide assemblies separated by spacers (and air gaps) as described above with respect to FIG. 10 may be used, where first output grating 1414 and second output grating 1416 may be formed in different waveguide assemblies. Because there generally would not be crosstalk between gratings in different waveguide assemblies and first output grating 1414 and second output grating 1416 are in different waveguide assemblies, there may not be crosstalk between first output grating 1414 and second output grating 1416.

Grating parameters for VBGs may include, for example, pitch, tilt angle, base refractive index, index modulation, thickness, and the like. According to certain embodiments, these grating parameters may be selected to provide the target field-of-view and wavelength coverage. For example, in the examples shown in FIGS. 12 and 13, the VBGs may have the same base refractive index but different respective grating periods. VBGs having the same base refractive index and the same grating periods may provide different field-of-view and wavelength coverage by varying the tilt angle of the VBGs. VBGs having the same grating period and the same tilt angle but different base refractive indices may also have different field-of-view and wavelength coverage.

Figure 15B:
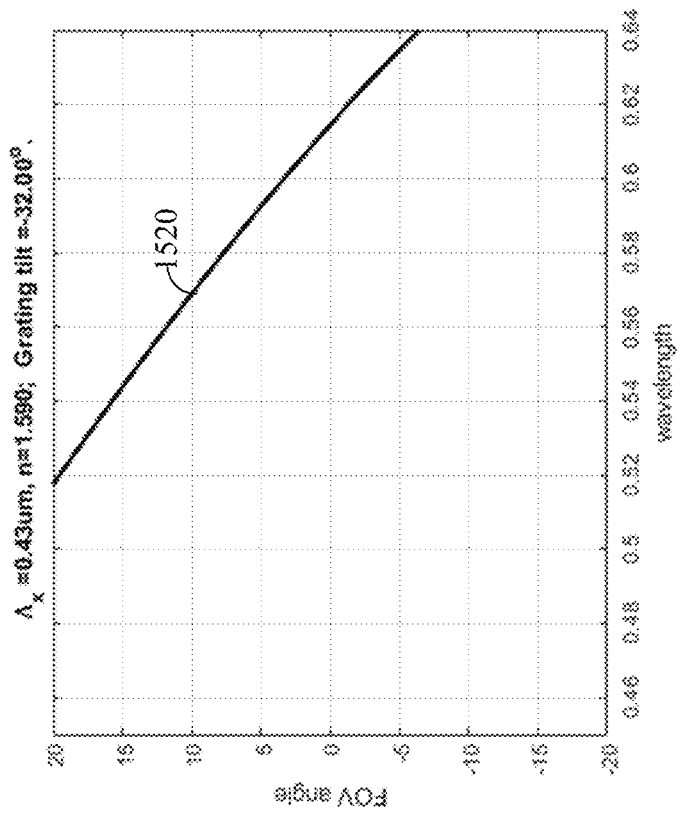
FIG. 15B illustrates a FOV and wavelength range covered by another example of a VBG having the same grating period and tilt angle as the VBG of FIG. 15A but in a grating layer having a different base refractive index.
Figure 15A:
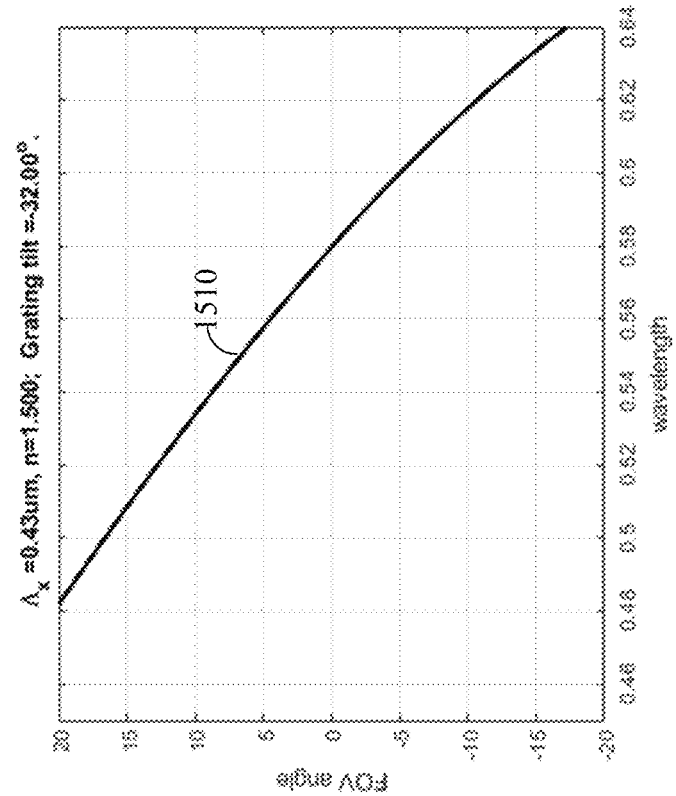
FIG. 15A illustrates a FOV and wavelength range covered by an example of a volume. Bragg grating.

FIG. 15A illustrates a field-of-view and wavelength range covered by an example of a volume Bragg grating. In the example illustrated in FIG. 15A, the grating period of the VBG is about 430 nm, the base refractive index of the VBG is about 1.5, and the grating tilt angle is about 32°. The nominal FOV and wavelength range covered by the VBG is shown by a curve 1510. FIG. 15B illustrates a field-of-view and wavelength range covered by another example of a VBG having the same grating period and the same tilt angle as the VBG of FIG. 15A but is recorded in a grating layer having a different base refractive index. In the example illustrated in FIG. 15B, the grating period of the VBG is about 430 nm, the base refractive index of the grating layer is about 1.59, and the grating tilt angle is about 32°. The nominal FOV and wavelength range covered by the VBG is shown by a curve 1520. As shown by curves 1510 and 1520, the two VBGs having the same grating period and the same tilt angle but different base refractive indices may have different field-of-view and wavelength coverage.

Figure 16:
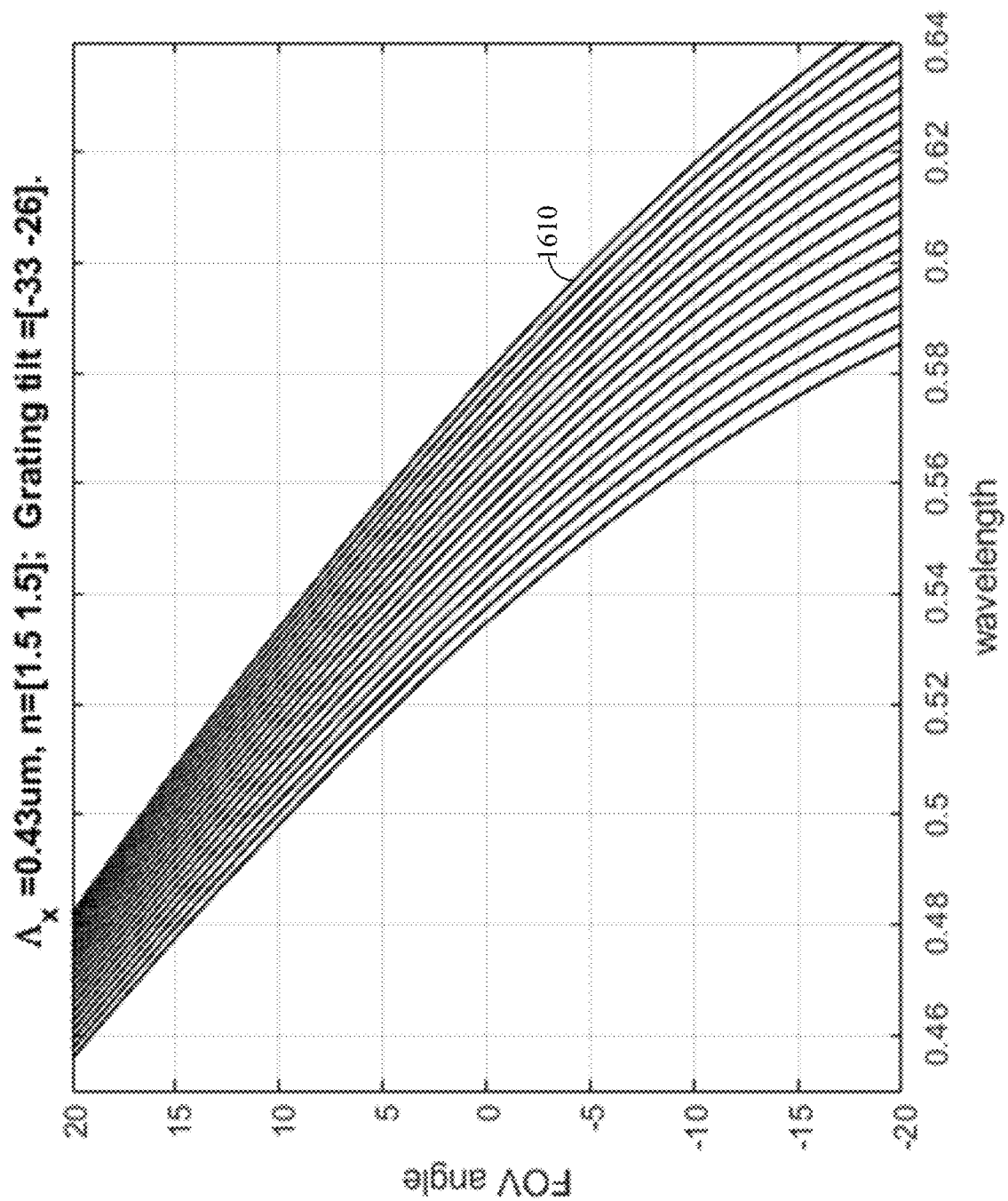
FIG. 16 illustrates FOV and wavelength ranges covered by examples of VBGs having the same grating period and the same base refractive index but different grating tilt angles.

FIG. 16 illustrates FOV and wavelength ranges covered by examples of VBGs having the same grating period and the same base refractive index but different grating tilt angles. Each curve 1610 in FIG. 16 shows the nominal FOV and wavelength range covered by VBGs having a same grating period (e.g., about 430 nm), a same base refractive index (e.g., about 1.5), and grating tilt angles between about −33° and about −26°. As illustrated, varying the tilt angle may change the field-of-view and wavelength range covered by the VBGs.

Figure 17:
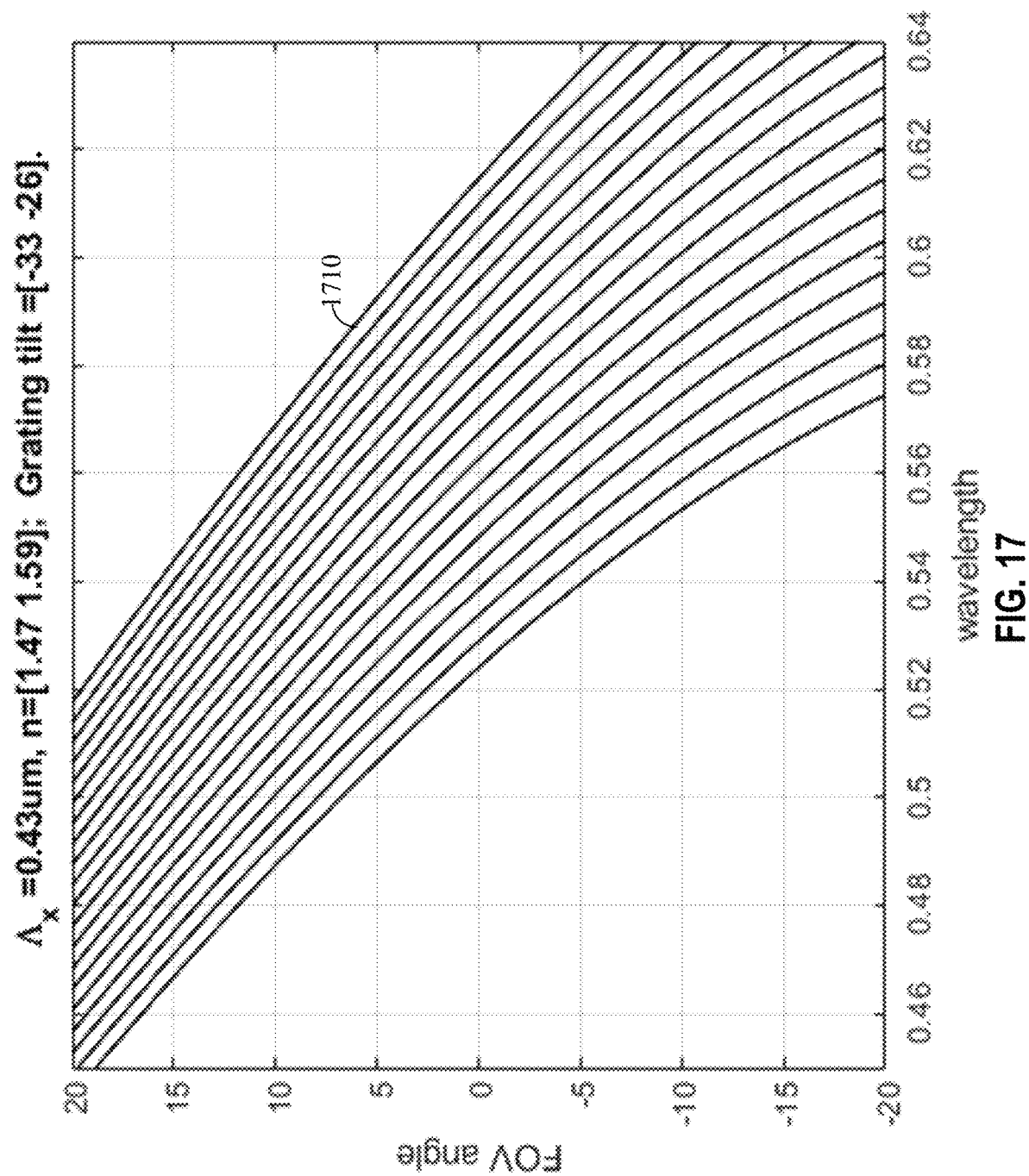
FIG. 17 illustrates FOV and wavelength ranges covered by examples of VBGs having the same grating period but different grating tilt angles and different base refractive indices.

FIG. 17 illustrates FOV and wavelength ranges covered by examples of VBGs having the same grating period but different grating tilt angles and different base refractive indices according to certain embodiments. Each curve 1710 in FIG. 17 shows the nominal FOV and wavelength range covered by a VBG having a grating period about 430 nm. Different curves 1710 in FIG. 17 correspond to VBGs with different tilt angles (e.g., between about −33° and −26°) and recorded in polymer layers having different base refractive indices (e.g., between about 1.47 and 1.59). As illustrated, varying the tilt angle and base refractive index may change the field-of-view and wavelength ranges of the VBGs. However, if the grating period is fixed, varying the tilt angle and the base refractive index of the VBGs within reasonable and practical ranges may not be able to cover the full FOV and wavelength range of a waveguide display.

According to certain embodiments, to provide the full field-of-view and wavelength coverage while minimizing crosstalk, VBGs for a waveguide display may be recorded in multiple holographic material layers, where the multiple holographic material layers may not have the same base refractive index. For example, in some embodiments, each holographic material layer may have a different respective based refractive index. In some embodiments, some holographic material layers may have the same base refractive index, but some other holographic material layers may have a different base refractive index. In some embodiments, VBGs recorded in a same holographic material layer may have different grating periods and the same or different tilt angles, and may have very different FOV and wavelength coverage. In some embodiments, some VBGs recorded in a same holographic material layer may have the same or similar grating period, but may have very different tilt angles, and thus may have very different FOV and wavelength coverage. Therefore, the field-of-view and wavelength ranges covered by the VBGs in a same holographic material layer may not overlap. As such, there may not be crosstalk between the VBGs in the same grating layer. In addition, because of the large difference in the Bragg conditions and the FOV and wavelength coverage, VBGs already recorded in the holographic material layer may not interfere with or may only minimally interfere with the subsequent recordings of other VBGs.

The VBGs in the multiple holographic material layers may be arranged into multiple groups. For example, the VBGs may be grouped based on their grating periods, where VBGs in a same group may have the same grating periods, but may have different grating tilt angles and/or different base refractive indices (e.g., in different grating layers) in order to have different FOV and wavelength coverage. In some embodiments, VBGs in a same group may be in different respective grating layers. In some embodiments, some VBGs in a group may be in a same grating layer and may have a large difference in the grating tilt angle such that their FOV and wavelength ranges may not overlap. There may not be crosstalk between VBGs in a same group, due to their common grating period and/or large difference in the FOV and wavelength ranges.

In one example, each grating layer may include M VBGs. The first VBG in each of the multiple holographic material layers may have the same grating period but may have a different respective tilt angle and/or base refractive index. Thus, the first VBGs in the respective holographic material layers may cover different respective FOV and wavelength ranges due to the different tilt angles and/or different base refractive indices. The first VBGs in the respective holographic material layers may form a group (e.g., a first group G1) of VBGs having the same grating period, and thus may have no crosstalk between them due to the same grating period (and the same diffraction angle). A second VBG in each of the holographic material layers may have the same grating period but may have a different respective tilt angle and/or base refractive index. Thus, the second VBGs in the respective holographic material layers may cover different respective FOV and wavelength ranges due to the different tilt angles and/or different base refractive indices. The second VBGs in the respective holographic material layers may form a group (e.g., a second group G2) of VBGs having the same grating period, and may have no crosstalk between them due to the same grating period (and the same diffraction angle). The grating period of the second VBG in each holographic material layer may be different from the grating period of the first VBG in each holographic material layer. Therefore, the second VBG in each holographic material layer may cover a different FOV and wavelength range compared with the first VBG in each holographic material layer. Similarly, the mth (for 1≤m≤M) VBG in each of the holographic material layers may have the same grating period but may have a different respective tilt angle and/or base refractive index. Thus, the mth VBGs in the respective holographic material layers may cover different respective FOV and wavelength ranges due to the different tilt angles and/or different base refractive indices. The mth VBGs in the respective holographic material layers may form a group (the mth group Gm) of VBGs having the same grating period, and thus may have no crosstalk between them due to the same grating period and the same diffraction angle.

In this way, VBGs in the same holographic material layer may not have crosstalk between them at least because of the large difference in the grating period and the corresponding FOV and wavelength range. In addition, each group of VBGs in the multiple holographic material layers (e.g., the mth group Gm) may have the same grating period, and thus may not have crosstalk between them because of the same grating period. Therefore, crosstalk between the VBGs can be significantly reduced, and the full FOV and wavelength range may be covered.

Figure 18:
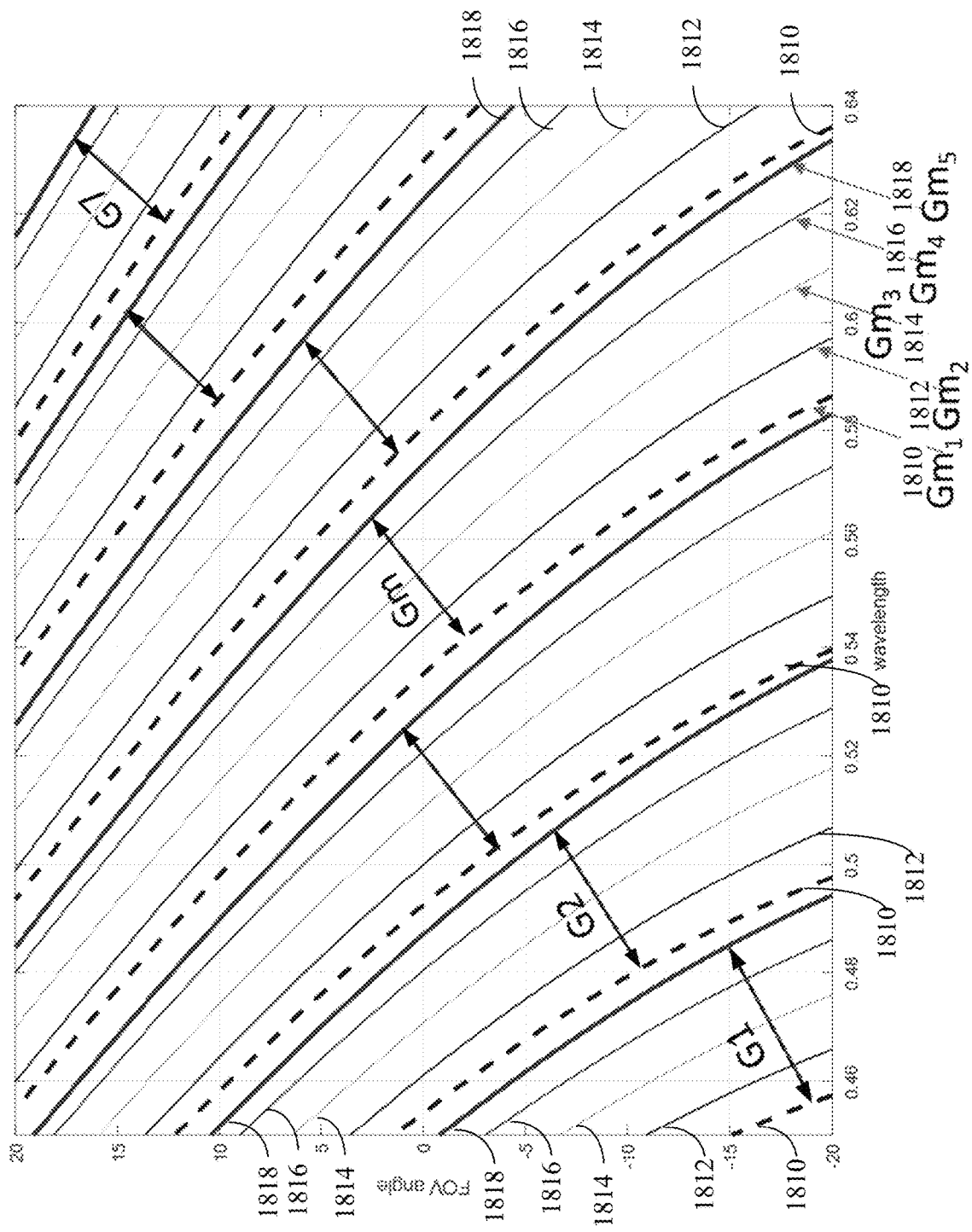
FIG. 18 illustrates FOV and wavelength ranges covered by VBGs in a simplified example of a waveguide display that includes grating layers having different base refractive indices according to certain embodiments.

FIG. 18 illustrates FOV and wavelength ranges covered by VBGs in a simplified example of a waveguide display that includes grating layers having different base refractive indices according to certain embodiments. The waveguide display may include N grating layers, where each grating layer may include M VBGs. The N grating layers may have two or more different base refractive indices. In some embodiments, VBGs in a same grating layer may have the same tilt angle but different grating periods. In some embodiments, some VBGs in a same grating layer may have different tilt angles and/or different grating periods. The mth VBG of the M VBGs in each grating layer of the N grating layers may have a same grating period but a different respective tilt angle. In addition, as described above, at least some grating layers of the N grating layers may have different base refractive indices. Therefore, the mth VBGs in the N respective grating layers may form an mth group (Gm) of N VBGs that have the same grating period but different tilt angles and/or different base refractive indices, and thus may cover different FOV and wavelength ranges. Because of the same grating period of the N VBGs in each group Gm, there may be no crosstalk between the N VBGs within a group Gm.

In the simplified example illustrated in FIG. 18, the waveguide display includes five (where N=5) grating layers. The five grating layers may have different base refractive indices. For example, the first and second grating layers may have a base refractive index about 1.48, the third grating layer may have a base refractive index about 1.5, while the fourth and fifth grating layers may have a base refractive index about 1.52. Each grating layer may include seven (where M=7) VBGs that may have different grating periods but may have the same tilt angle (or different tilt angles in some embodiments). For example, the seven VBGs in the first grating layer may have FOV and wavelength ranges represented by curves 1810 and may have a tilt angle about 28°, the seven VBGs in the second grating layer may have FOV and wavelength ranges represented by curves 1812 and may have a tilt angle about 28.5°, the seven VBGs in the third grating layer may have FOV and wavelength ranges represented by curves 1814 and may have a tilt angle about 29°, the seven VBGs in the fourth grating layer may have FOV and wavelength ranges represented by curves 1816 and may have a tilt angle about 29.5°, and the seven VBGs in the fifth grating layer may have FOV and wavelength ranges represented by curves 1818 and may have a tilt angle about 30°. As illustrated, the seven VBGs in each grating layer represented by curves 1810, 1812, 1814, 1816, or 1818 may have very different non-overlapping FOV and wavelength coverage, and thus may not have crosstalk between each other.

In the illustrated example, the VBGs in the five grating layers may be grouped into seven groups Gm (m=1, 2, . . . , 7), where each group Gm may include five VBGs ($Gm_1$, $Gm_2$, $Gm_3$, $Gm_4$, and $Gm_5$) each in a different respective grating layer of the five grating layers. The five VBGs in each group Gm may have the same grating period but different tilt angle (e.g., about 28°, 28.5°, 29°, 29.5°, and 30° for reflective VBGs), and thus may have different FOV and wavelength coverage and may not cause crosstalk between each other to form ghost images due to the same grating period.

There may be some overlapping between the FOV and wavelength coverage of VBGs in different groups. For example, the fifth VBG (represented by a curve 1818) of group G1 in the fifth grating layer and the first VBG (represented by a curve 1810) of group G2 in the first grating layer may have some overlapping FOV and/or wavelength coverage. Similarly, the fifth VBG (represented by a curve 1818) of group G2 in the fifth grating layer and the first VBG (represented by a curve 1810) of group G3 in the first grating layer may have some overlapping FOV and wavelength coverage, and so on.

As described above, there generally may not be crosstalk between VBGs in different waveguide assemblies that are separated by air gaps. According to certain embodiments, the fifth grating layer and the first grating layer may be in different waveguide assemblies as described above with respect to FIG. 10. As such, because the fifth VBG (represented by a curve 1818) of each group Gm is in the fifth grating layer and the first VBG (represented by a curve 1810) of each group Gm is in the first grating layer, there would not be crosstalk between the fifth VBG of group Gm and the first VBG of group Gm+1.

According to certain embodiments, VBGs in each group may be designed such that the overall FOV and wavelength range of group Gm may partially overlap with the overall FOV and wavelength range of group Gm+1. For example, the FOV and wavelength range of the last (e.g., fifth) VBG (e.g., in the fifth grating layer that is in one waveguide assembly) of group Gm and the FOV and wavelength range of the first VBG (e.g., in the first grating layer that is in another waveguide assembly) of group Gm+1 may at least partially overlap. Therefore, the full FOV range of the waveguide display can be covered using narrowband light sources (e.g., with FWHM spectral width less than 20 nm or less than 10 nm), such as SLEDs, lasers, or the like, without crosstalk between the VBGs.

Figure 19:
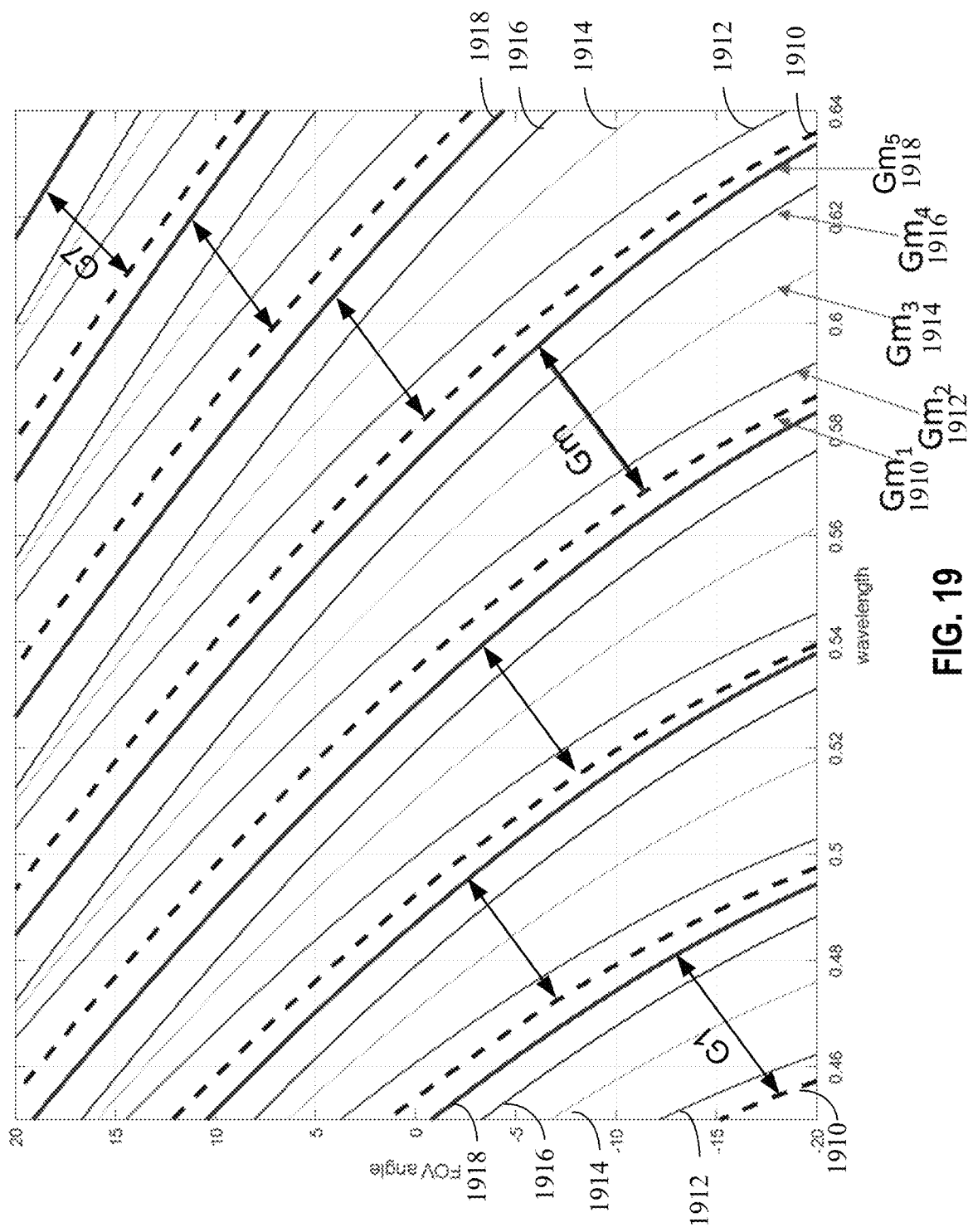
FIG. 19 illustrates FOV and wavelength ranges covered by VBGs in another simplified example of a waveguide display that includes grating layers having different base refractive indices according to certain embodiments.

FIG. 19 illustrates FOV and wavelength ranges covered by VBGs in a simplified example of a waveguide display that includes grating layers having different base refractive indices according to certain embodiments. The waveguide display shown by FIG. 19 may be similar to the waveguide display shown by FIG. 18, but may have fewer grating layers, where some VBGs in the same grating layer may have a difference in the grating period and/or tilt angle that is sufficiently large such that the FOV and wavelength ranges of these VBGs in the same grating layer may not overlap. Therefore, a VBG already recorded in the grating layer may not undesirably diffract the recording light during the subsequent exposures to interfere with the recording of new VBGs in the grating layer, and there may not be crosstalk between the VBGs in the grating layer during operation of the waveguide display.

In the simplified example illustrated in FIG. 19, the waveguide display may include three grating layers. The three grating layers may have different base refractive indices. For example, the first grating layer may have a base refractive index about 1.48, the second grating layer may have a base refractive index about 1.5, while the third grating layer may have a base refractive index about 1.52. Each grating layer may include multiple VBGs that may have different grating periods and/or different tilt angles. For example, the first grating layer may include 14 VBGs that each have a unique combination of the grating period and tilt angle and thus a unique FOV and wavelength range. The FOV and wavelength ranges of the 14 VBGs may be separate apart and may have no overlap, and thus there may not be crosstalk among the 14 VBGs. In some embodiments, seven of the 14 VBGs may have a same first tilt angle but different respective grating periods, and the other seven VBGs of the 14 VBGs may have a same second tilt angle but different respective grating periods. The second grating layer may include seven VBGs that each have a unique respective grating period and thus a unique FOV and wavelength coverage. The seven VBGs in the second grating layer may have a same third tilt angle (or may have different tilt angles in some embodiments). The third grating layer may also include 14 VBGs that each have a unique combination of the grating period and tilt angle and thus a unique FOV and wavelength coverage. The FOV and wavelength ranges of the 14 VBGs in the third grating layer may be separate apart and may have no overlap, and thus there may not be crosstalk among the 14 VBGs. In some embodiments, seven of the 14 VBGs in the third grating layer may have a same fourth tilt angle but different respective grating periods, and the other seven VBGs of the 14 VBGs in the third grating layer may have a same fifth tilt angle but different respective grating periods. As such, in some embodiments, the three grating layers may include 35 VBGs in 5 subsets, where each subset may include 7 VBGs that may have the same base refractive index (on a same grating layer) and the same tilt angle but different respective grating periods. The mth VBG (m7) in each of the five subset of 7 VBGs may have the same grating period, but may have different tilt angles and/or different base refractive indices.

Based on, for example, the grating period, the 35 VBGs in the three grating layers may be divided into seven groups, where each group may include two VBGs (e.g., the first VBG $Gm_1$ corresponding to a curve 1910 and the fourth VBG $Gm_4$ corresponding to a curve 1916) in the first grating layer, one VBG (e.g., the third VBG $Gm_3$ corresponding to a curve 1914) in the second grating layer, and two VBGs (e.g., the second $Gm_2$ corresponding to a curve 1912 and the fifth VBG $Gm_5$ corresponding to a curve 1918) in the third grating layer, where m is the group number and may be an integer from 1 to 7 in the illustrated example. The seven first VBGs $Gm_1$ in the seven respective groups may have the same tilt angle but different grating periods. Similarly, the seven second VBGs $Gm_2$ (the seven third VBGs $Gm_3$, the seven fourth VBG $Gm_4$, or the seven fifth VBG $Gm_5$) in the seven respective groups may have the same tilt angle but different grating periods. Even though VBGs $Gm_1$ and $Gm_4$ may be on the same grating layer, they may have different tilt angles (and/or different grating periods in some embodiments) and thus their FOV and wavelength ranges may not overlap. Even though VBGs $Gm_2$ and $Gm_5$ are on the same grating layer, they may have different tilt angles (and/or different grating periods in some embodiments) and thus their FOV and wavelength ranges may not overlap either. VBGs $Gm_1$ and $Gm_2$ in a same group m may have the same grating period (but different tilt angles and different base refractive indices to provide different FOV and wavelength coverage), and thus there may not be crosstalk between VBGs $Gm_1$ and $Gm_2$. VBGs $Gm_4$ and $Gm_5$ in a same group m may have the same grating period (but different tilt angles and different base refractive indices to provide different FOV and wavelength coverage), and thus there may not be crosstalk between VBGs $Gm_4$ and $Gm_5$. In some embodiment, VBGs $Gm_1$-$Gm_5$ in each group m may have the same grating period (but different tilt angles and/or different base refractive indices), and thus there may not be crosstalk between the five VBGs in the same group.

In some cases, there may be some overlap between the FOV and wavelength ranges of VBGs in different groups. For example, VBG Gm5 (represented by a curve 1918) of group G1 (m=1) in the third grating layer and VBG Gm1 (represented by a curve 1910) of group G2 (m=2) in the first grating layer may have some overlapping FOV and wavelength coverage. Similarly, the VBG Gm5 of group G2 (m=2) in the third grating layer and VBG Gm1 of group G3 (m=3) in the first grating layer may have some overlapping FOV and wavelength coverage, and so on.

As described above, in some embodiments, the third grating layer and the first grating layer may be in different waveguide assemblies as described above with respect to FIG. 10. As such, because the fifth VBG (represented by a curve 1918) of each group Gm is in the third grating layer and the first VBG (represented by a curve 1910) of each group Gm is in the first grating layer, there would not be crosstalk between the fifth VBG of group Gm and the first VBG of group Gm+1. Furthermore, in some embodiments, VBGs in each group may be designed such that the overall FOV and wavelength range of group Gm may partially overlap with the overall FOV and wavelength range of group Gm+1. For example, the FOV and wavelength range of the last (e.g., fifth) VBG (e.g., in the third grating layer that is in one waveguide assembly) of group Gm and the FOV and wavelength range of the first VBG (e.g., in the first grating layer that is in another waveguide assembly) of group Gm+1 may at least partially overlap. Therefore, the full FOV range of the waveguide display can be covered using narrowband light sources (e.g., with FWHM spectral widths less than 20 nm or less than 10 nm), such as SLEDs, lasers, or the like, without crosstalk between the VBGs.

It is noted that various other arrangements of the VBGs in the grating layers may be used. For example, each group Gm may include fewer or more VBGs, fewer or more grating layers may be used, and the number of VBGs in each grating layer may be the same or different for the multiple grating layers. In one example, each group Gm may include five VBGs, where two VBGs (e.g., the first VBG Gm1 and the fourth VBG Gm4) of the five VBGs may be in the first grating layer (e.g., having a base refractive index about 1.48), two other VBGs (e.g., the second VBG Gm2 and the fifth VBG Gm5) of the five VBGs may be in the second grating layer (e.g., having a base refractive index about 1.5), and one VBG (e.g., the third VBG Gm3) may be in the third grating layer (e.g., having a base refractive index about 1.52). In another example, each group Gm may include six VBGs (e.g., Gm1-Gm6), where two VBGs (e.g., the first VBG Gm1 and the fourth VBG Gm4) of the six VBGs may be in the first grating layer, two VBGs (e.g., the second VBG Gm2 and the fifth VBG Gm5) of the six VBGs may be in the second grating layer, and two VBGs (e.g., the third VBG Gm3 and the sixth VBG Gm6) of the six VBGs may be in the third grating layer. In yet another example, each group Gm may include six VBGs (e.g., Gm1-Gm6), where three VBGs (e.g., the first VBG Gm1, the third VBG Gm3, and the fifth VBG Gm5) of the six VBGs may be in the first grating layer, and the other three VBGs (e.g., the second VBG Gm2, the fourth VBG Gm4, and the sixth VBG Gm6) of the six VBGs may be in the second grating layer.

FIG. 20A illustrates FOV and wavelength ranges covered by reflective VBGs in a simplified example of a waveguide display that includes grating layers having a same base refractive index. In the illustrated example, the waveguide display may include multiple grating layers, such as 2, 3, 4, or more grating layers that have the same base refractive index, such as about 1.5. The VBGs for covering the full FOV and wavelength range may be grouped into M groups. Each group Gm of the M groups ($1 \leq m \leq M$) may include seven VBGs (e.g., $Gm_1$ to $Gm_7$) having the same grating periods but different tile angles, such that the seven VBGs may cover different respective FOV and wavelength ranges but may not have crosstalk between them. For example, the seven VBGs in each group may have title angles of 28°, 28⅓°, 28⅔°, 29°, 29⅓°, 29⅔°, and 30°, respectively. Each line 2010 shows the nominal FOV and wavelength range of each VBG.

As described above, in some embodiments, the M VBGs $Gm_1$ in the M groups may be recorded in a first grating layer, the M VBGs $Gm_2$ in the M groups may be recorded in a second grating layer, the M VBGs $Gm_3$ in the M groups may be recorded in a third grating layer, and so on. In some embodiments, the M VBGs $Gm_1$ in the M groups and the M VBGs Gins in the M groups may be recorded in a first grating layer, the M VBGs $Gm_2$ in the M groups and the M VBGs $Gm_6$ in the M groups may be recorded in a second grating layer, the M VBGs $Gm_3$ in the M groups and the M VBGs $Gm_7$ in the M groups may be recorded in a third grating layer, and the M VBGs $Gm_4$ in the M groups may be recorded in a fourth grating layer, where the four grating layers may have two or more different base refractive indices. One skilled in the art will readily recognize that other arrangements of the VBGs in the multiple grating layers may also be made in alternative embodiments.

There may be some overlap between the FOV and wavelength ranges of VBGs in different groups. For example, VBG $Gm_7$ of group G1 (m=1) and VBG Gm1 of group G2 (m=2) may have some overlapping FOV and wavelength coverage and may have different grating periods, and thus there may be crosstalk between the two VBGs. Similarly, VBG $Gm_7$ of group G2 (m=2) and VBG $Gm_1$ of group G3 (m=3) may have some overlapping FOV and wavelength coverage and may have different grating periods, and thus there may be crosstalk between the two VBGs, and so on.

As shown in FIG. 20A, when the grating layers have the same base refractive index, the gap between the FOV and wavelength ranges of VBG $Gm_7$ of the mth group (Gm) and VBG Gm1 of the (m+1)th group (Gm+1) may be much wider at shorter wavelengths and larger positive FOV angles (e.g., at the top left corner of FIG. 20A), and thus there may be some FOV and wavelength ranges not covered by the VBGs. At the same time, the gap between the FOV and wavelength ranges of VBG $Gm_7$ of the mth group (Gm) and VBG Gm1 of the (m+1)th group (Gm+1) may be much narrower for longer wavelengths and larger negative FOV angles (e.g., at the bottom right corner of FIG. 20A), and thus there may be crosstalk between the two VBGs. Therefore, FIG. 20A shows that, when the grating layers have the same base refractive index, it can be difficult to both provide the full FOV and wavelength coverage and avoid crosstalk between reflective VBGs in different groups.

FIG. 20B illustrates FOV and wavelength ranges covered by reflective VBGs in a simplified example of a waveguide display that includes grating layers having different base refractive indices according to certain embodiments. In the illustrated example, waveguide display may include multiple grating layers, such as 2, 3, 4, or more grating layers that may have different base refractive indices (e.g., between about 1.48 and 1.52). For example, one or more of the grating layers may have a base refractive index about 1.48, one or more of the grating layers may have a base refractive index about 1.5, and one or more of the grating layers may have a base refractive index about 1.52. The VBGs for covering the full FOV and wavelength range may be grouped into M groups. Each group Gm of the M groups may include seven VBGs (e.g., $Gm_1$ to $Gm_7$) that are recorded in the multiple grating layers and have the same grating periods but different tile angles (and different based refractive indices), such that the seven VBGs may cover different respective FOV and wavelength ranges but may not have crosstalk between them. For example, the seven VBGs in each group Gm of the M groups may have title angles of 28°, 28⅓°, 28⅔°, 29°, 29⅓°, 29⅔°, and 30°, 28°, FOV and wavelength range of each VBG.

In some embodiments, the M VBGs $Gm_1$ in the M groups (m=1, 2, . . . , M) may be recorded in a first grating layer that has a first base refractive index, the M VBGs $Gm_2$ in the M groups may be recorded in a second grating layer that has a second base refractive index, the M VBGs $Gm_3$ in the M groups may be recorded in a third grating layer that has a third base refractive index, and so on. In some embodiments, the M VBGs $Gm_1$ in the M groups and the M VBGs $Gm_5$ in the M groups may be recorded in one or more grating layers having a first base refractive index; the M VBGs $Gm_2$ in the M groups, the M VBGs $Gm_4$ in the M groups, and the M VBGs $Gm_6$ in the M groups may be recorded in one or more grating layers having a second base refractive index; and the M VBGs $Gm_3$ in the M groups and the M VBGs $Gm_7$ in the M groups may be recorded in one or more grating layers having a third base refractive index. Other arrangements of the VBGs in the multiple grating layers may also be made. For example, in some embodiments, the M VBGs $Gm_1$ in the M groups may be recorded in a first grating layer having a first base refractive index, the M VBGs $Gm_2$ in the M groups may be recorded in a second grating layer having the first base refractive index, the M VBGs $Gm_3$ in the M groups may be recorded in a third grating layer having a second base refractive index, the M VBGs $Gm_4$ in the M groups may be recorded in a fourth grating layer having the second base refractive index, the M VBGs $Gm_5$ in the M groups may be recorded in a fifth grating layer having the second base refractive index, the M VBGs $Gm_6$ in the M groups may be recorded in a sixth grating layer having a third base refractive index, and the M VBGs $Gm_7$ in the M groups may be recorded in a seventh grating layer having the third base refractive index.

As described above, there may be some overlap between the FOV and wavelength ranges of VBGs in different groups. For example, VBG $Gm_7$ of group G1 and VBG Gm1 of group G2 may have some overlapping FOV and wavelength coverage and may have different grating periods, and thus there may be crosstalk between the two VBGs. Similarly, VBG $Gm_7$ of group G2 and VBG $Gm_1$ of group G3 may have some overlapping FOV and/or wavelength coverage and may have different grating periods, and thus there may be crosstalk between the two VBGs, and so on. As shown in FIG. 20B, when the grating layers have different base refractive indices, the gap between the FOV and wavelength ranges of VBG $Gm_7$ of the mth group (Gm) and VBG Gm1 of the (m+1)th group (Gm+1) may be made more uniform in the full FOV and wavelength range of the waveguide display by selecting the appropriate grating period, the tilt angle, and the base refractive index for each VBG. For example, the parameters of the VBGs may be selected such that the gap between the FOV and wavelength ranges of VBG $Gm_7$ of the mth group (Gm) and VBG Gm1 of the (m+1)th group (Gm+1) may become narrower (e.g., as shown by a gap 2030), wider (e.g., as shown by a gap 2040), or approximately unchanged (e.g., as shown by a gap 2050) as the FOV angle decreases and the wavelength increases. Thus, FIG. 20B shows that, when the grating layers have different base refractive indices, the grating periods, the tilt angles, and the base refractive indices of the VBGs can be optimized to both provide the full FOV and wavelength coverage and avoid crosstalk between VBGs in different groups.

As described above, in some embodiments, to reduce the crosstalk between the last VBG in group Gm and the first VBG in group Gm+1, the first VBG and the last VBG in each group may be in two different grating layers that are in two different respective waveguide assemblies. Furthermore, in some embodiments, VBGs in each group may be designed such that the overall FOV and wavelength range of group Gm may partially overlap with the overall FOV and wavelength range of group Gm+1. For example, the FOV and wavelength range of the last VBG (e.g., in a grating layer that is in one waveguide assembly) of group Gm and the FOV and wavelength range of the first VBG (e.g., in another grating layer that is in another waveguide assembly) of group Gm+1 may at least partially overlap. As such, the full FOV range of the waveguide display can be covered using narrowband light sources (e.g., with FWHM spectral widths less than 20 nm or less than 10 nm), such as SLEDs, lasers, or the like, without crosstalk between the VBGs.

Figures 21A, 21B:
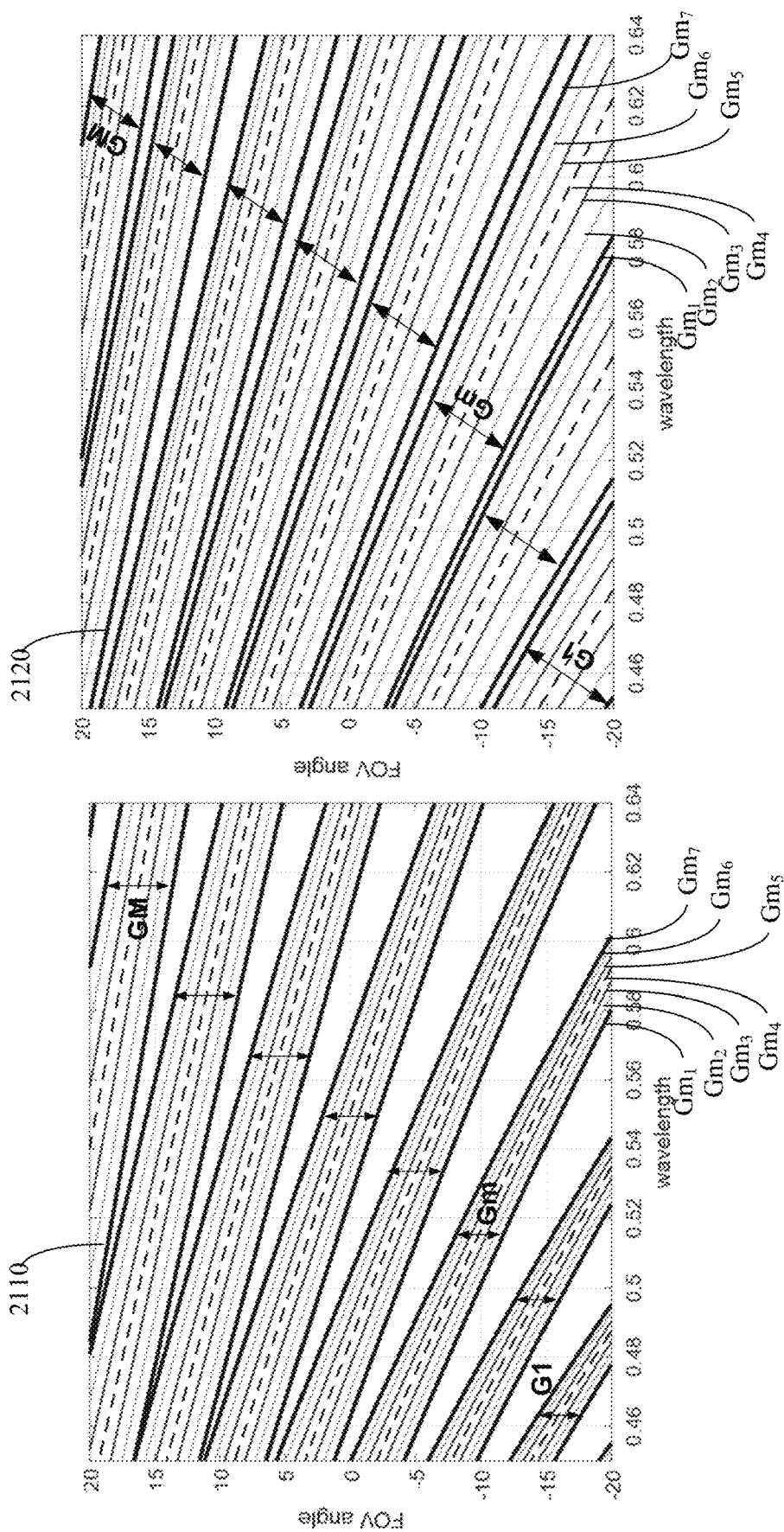
FIG. 21A illustrates FOV and wavelength ranges covered by transmissive VBGs in a simplified example of a waveguide display that includes grating layers having a same base refractive index.
FIG. 21B illustrates FOV and wavelength ranges covered by transmissive VBGs in a simplified example of a waveguide display that includes grating layers having different base refractive indices according to certain embodiments.

FIG. 21A illustrates FOV and wavelength ranges covered by transmissive VBGs in a simplified example of a waveguide display that includes grating layers having a same base refractive index. As described above, when transmissive VBGs are used for the output grating (e.g., output grating 940), the second middle grating (e.g., second middle grating 930) and the output grating can be made to at least partially overlap with each other to reduce the form factor of the waveguide display, without causing FOV clipping.

In the example illustrated in FIG. 21A, the waveguide display may include multiple grating layers, such as 2, 3, 4, or more grating layers that have the same base refractive index, such as about 1.5. The transmissive VBGs for covering the full FOV and wavelength range may be grouped into M groups. Each mth group Gm of the M groups may include seven VBGs (e.g., $Gm_1$ to $Gm_7$) having the same grating period but different tile angles, such that the seven VBGs may cover different respective FOV and wavelength ranges but may not have crosstalk between them. For example, the seven VBGs in each group may have title angles of 59°, 59⅓°, 59⅔°, 60°, 60⅓°, 60⅔°, and 61°, respectively. Each line 2110 shows the nominal FOV and wavelength coverage of each reflective VBG.

As described above, in some embodiments, the M VBGs $Gm_1$ in the M groups may be recorded in a first grating layer, the M VBGs $Gm_2$ in the M groups may be recorded in a second grating layer, the M VBGs $Gm_3$ in the M groups may be recorded in a third grating layer, and so on. In some embodiments, the M VBGs $Gm_1$ in the M groups and the M VBGs $Gm_5$ in the M groups may be recorded in a first grating layer, the M VBGs $Gm_2$ in the M groups and the M VBGs $Gm_6$ in the M groups may be recorded in a second grating layer, the M VBGs $Gm_3$ in the M groups and the M VBGs $Gm_7$ in the M groups may be recorded in a third grating layer, and the M VBGs $Gm_4$ in the M groups may be recorded in a fourth grating layer. Many other arrangements of the VBGs in the multiple grating layers may also be made. For example, in some embodiments, the M VBGs $Gm_1$ in the M groups and the M VBGs $GM_5$ in the M groups may be recorded in a first grating layer; the M VBGs $Gm_2$ in the M groups, the M VBGs $Gm_4$ in the M groups, and the M VBGs $Gm_6$ in the M groups may be recorded in a second grating layer, while the M VBGs $Gm_3$ in the M groups and the M VBGs $Gm_7$ in the M groups may be recorded in a third grating layer.

There may be some overlap between the FOV and wavelength ranges of the VBGs in different groups. For example, VBG $Gm_7$ of group G1 and VBG Gm1 of group G2 may have some overlapping FOV and wavelength coverage and may have different grating periods, and thus there may be crosstalk between the two VBGs. Similarly, VBG $Gm_7$ of group G2 and VBG $Gm_1$ of group G3 may have some overlapping FOV and/or wavelength coverage and may have different grating periods, and thus there may be crosstalk between the two VBGs, and so on. As shown in FIG. 21A, when the grating layers have the same base refractive index, the gap between the FOV and wavelength ranges of VBG $Gm_7$ of the mth group (Gm) and VBG Gm1 of the (m+1)th group (Gm+1) may be much wider at longer wavelengths and larger negative FOV angles (e.g., at the bottom right corner of FIG. 21A), and thus there may be some FOV and wavelength ranges not covered by the VBGs. With the same grating parameters, the gap between the FOV and wavelength ranges of VBG $Gm_7$ of the mth group (Gm) and VBG Gm1 of the (m+1)th group (Gm+1) may be much narrower at shorter wavelengths and larger positive FOV angles (e.g., at the top left corner of FIG. 21A), and thus there may be crosstalk between the two VBGs. As such, FIG. 21A shows that, when the grating layers have the same base refractive index, it can be difficult to both provide the full FOV and wavelength coverage and avoid crosstalk between the transmissive VBGs in different groups.

FIG. 21B illustrates FOV and wavelength ranges covered by transmissive VBGs in a simplified example of a waveguide display that includes grating layers having different base refractive indices according to certain embodiments. In the illustrated example, waveguide display may include multiple grating layers, such as 2, 3, 4, or more grating layers that may have different base refractive indices (e.g., between about 1.35 and 1.65). For example, one or more of the grating layers may have a base refractive index about 1.35, one or more of the grating layers may have a base refractive index about 1.5, and one or more of the grating layers may have a base refractive index about 1.65. The VBGs for covering the full FOV and wavelength range may be grouped into M groups. Each group Gm of the M groups (m=1, 2, . . . , M) may include seven VBGs (e.g., $Gm_1$ to $Gm_7$) that are recorded in the multiple grating layers and have the same grating periods but different tile angles (and different base refractive indices), such that the seven VBGs may cover different respective FOV and wavelength ranges but may not have crosstalk between them. For example, the seven VBGs in each group may have title angles of 59°, 59⅓°, 59⅔°, 60°, 60⅓°, 60⅔°, and 61°, respectively. Each line 2120 in FIG. 21B shows the nominal FOV and wavelength coverage of each transmissive VBG.

In some embodiments, the M VBGs $Gm_1$ in the M groups may be recorded in a first grating layer that has a first base refractive index, the M VBGs $Gm_2$ in the M groups may be recorded in a second grating layer that has a second base refractive index, the M VBGs $Gm_3$ in the M groups may be recorded in a third grating layer that has a third base refractive index, and so on. In some embodiments, the M VBGs $Gm_1$ in the M groups and the M VBGs $Gm_5$ in the M groups may be recorded in one or more grating layers having a first base refractive index (e.g., about 1.35); the M VBGs $Gm_2$ in the M groups, the M VBGs $Gm_4$ in the M groups, and the M VBGs $Gm_6$ in the M groups may be recorded in one or more grating layers having a second base refractive index (e.g., about 1.5); and the M VBGs $Gm_3$ in the M groups and the M VBGs $Gm_7$ in the M groups may be recorded in one or more grating layers having a third base refractive index (e.g., about 1.65). Other arrangements of the VBGs in the multiple grating layers may also be made. For example, in some embodiments, the M VBGs $Gm_1$ in the M groups may be recorded in a first grating layer having a first base refractive index (e.g., about 1.35), the M VBGs $Gm_2$ in the M groups may be recorded in a second grating layer having the first base refractive index, the M VBGs $Gm_3$ in the M groups may be recorded in a third grating layer having a second base refractive index (e.g., about 1.5), the M VBGs $Gm_4$ in the M groups may be recorded in a fourth grating layer having the second base refractive index, the M VBGs $Gm_5$ in the M groups may be recorded in a fifth grating layer having the second base refractive index, the M VBGs $Gm_6$ in the M groups may be recorded in a sixth grating layer having a third base refractive index (e.g., about 1.65), and the M VBGs $Gm_7$ in the M groups may be recorded in a seventh grating layer having the third base refractive index.

As described above, there may be some overlap between the FOV and wavelength coverage of VBGs in different groups. For example, VBG $Gm_7$ of group G1 and VBG Gm1 of group G2 may have some overlapping FOV and wavelength coverage and may have different grating periods, and thus there may be crosstalk between the two VBGs. Similarly, VBG $Gm_7$ of group G2 and VBG $Gm_1$ of group G3 may have some overlapping FOV and wavelength coverage and may have different grating periods, and thus there may be crosstalk between the two VBGs, and so on. As shown in FIG. 21B, when the grating layers have different base refractive indices, the gap between the FOV and wavelength ranges of VBG $Gm_7$ of the mth group (Gm) and VBG $Gm_1$ of the (m+1)th group (Gm+1) may be made more uniform in the full FOV and wavelength range of the waveguide display by selecting the appropriate grating period, tilt angle, and base refractive index for each VBG. For example, the parameters of the VBGs may be selected such that the gap between the FOV and wavelength ranges of VBG $Gm_7$ of the mth group (Gm) and VBG Gm1 of the (m+1)th group (Gm+1) may become narrower, wider, or approximately unchanged as the FOV angle decreases and the wavelength increases. FIG. 21B shows that, when the grating layers have different base refractive indices, the grating periods, the tilt angles, and the base refractive indices of the transmissive VBGs can be optimized to both provide full FOV and wavelength coverage and avoid crosstalk between the transmissive VBGs in different groups.

As described above, in some embodiments, to reduce the crosstalk between the last VBG in group Gm and the first VBG in group Gm+1, the first VBG and the last VBG in each group may be in two different grating layers that are in two different respective waveguide assemblies. Furthermore, in some embodiments, VBGs in each group may be designed such that the overall FOV and wavelength range of group Gm may partially overlap with the overall FOV and wavelength range of group Gm+1. For example, the FOV and wavelength range of the last VBG (e.g., in a grating layer that is in one waveguide assembly) of group Gm and the FOV and wavelength range of the first VBG (e.g., in another grating layer that is in another waveguide assembly) of group Gm+1 may at least partially overlap. As such, the full FOV range of the waveguide display can be covered using narrowband light sources (e.g., with FWHM spectral widths less than 20 nm or less than 10 nm), such as SLEDs, lasers, or the like, without crosstalk between the VBGs.

It is noted that the simplified examples described above are for illustration purposes and are not intended to limit the techniques disclosed herein to the specific examples. Various other arrangements of the VBGs in the grating layers may be used to cover the full FOV and wavelength range of the waveguide display, while reducing or minimizing crosstalk between the gratings. For example, a waveguide display may include any suitable number of groups of VBGs (e.g., greater than 5, 6, 7, or more), each group of VBGs may include any suitable number of gratings (e.g., greater than 3, 4, 5, 7, or more), and the VBGs may be recorded in two or more grating layers, where the two or more grating layers may have two or more different base refractive indices. In some embodiments, some grating layers may have the same base refractive index. In some embodiments, VBGs in a group may each be in a different grating layer. In some embodiments, two or more VBGs in a group of VBGs may be in a same grating layer. In various embodiments, each VBG of the waveguide display may have a unique combination of base refractive index, grating period, and tilt angle to cover a unique FOV and wavelength range. For example, the VBGs in a group of VBGs may have a same grating period, but may have different respective tilt angles and two or more different base refractive indices. In some embodiments, a waveguide display may include more than one waveguide assembly, such as two or more waveguide assemblies, where each waveguide assembly may include one or more grating layers. In some embodiments, the last grating and the first grating in each group may be in two different grating layers that are in two different respective waveguide assemblies, and may have at least partially overlapping FOV and wavelength coverage, such that the full FOV range of the waveguide display can be covered using narrowband light sources (e.g., SLEDs, lasers, etc.) without having crosstalk between the gratings.

Embodiments of the invention may be used to implement components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 22:
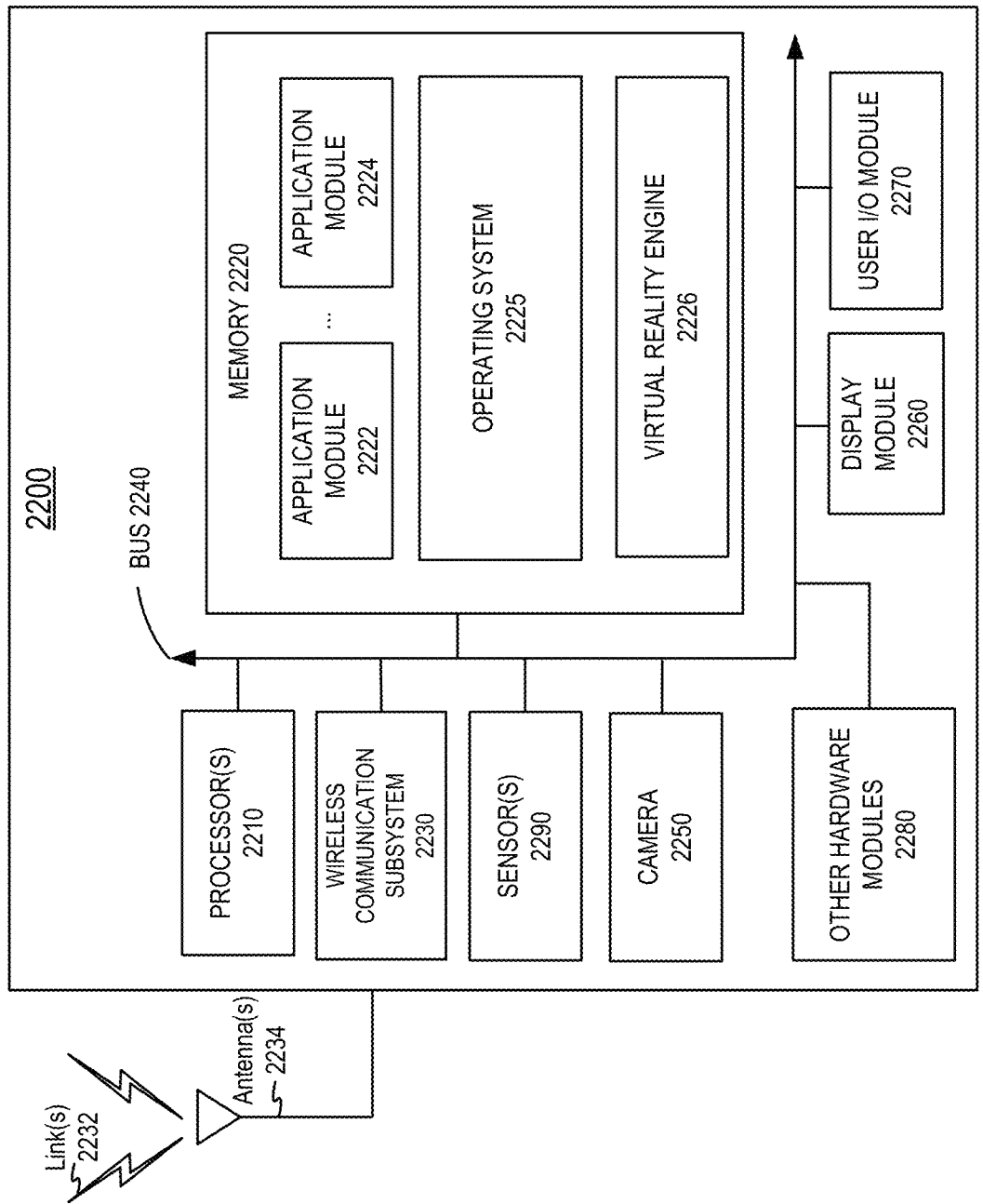
FIG. 22 is a simplified block diagram of an example of an electronic system in an example of a near-eye display according to certain embodiments.

FIG. 22 is a simplified block diagram of an example of an electronic system 2200 of an example near-eye display (e.g., HMD device) for implementing some of the examples disclosed herein. Electronic system 2200 may be used as the electronic system of an HMD device or other near-eye displays described above. In this example, electronic system 2200 may include one or more processor(s) 2210 and a memory 2220. Processor(s) 2210 may be configured to execute instructions for performing operations at a number of components, and can be, for example, a general-purpose processor or microprocessor suitable for implementation within a portable electronic device. Processor(s) 2210 may be communicatively coupled with a plurality of components within electronic system 2200. To realize this communicative coupling, processor(s) 2210 may communicate with the other illustrated components across a bus 2240. Bus 2240 may be any subsystem adapted to transfer data within electronic system 2200. Bus 2240 may include a plurality of computer buses and additional circuitry to transfer data.

Memory 2220 may be coupled to processor(s) 2210. In some embodiments, memory 2220 may offer both short-term and long-term storage and may be divided into several units. Memory 2220 may be volatile, such as static random access memory (SRAM) and/or dynamic random access memory (DRAM) and/or non-volatile, such as read-only memory (ROM), flash memory, and the like. Furthermore, memory 2220 may include removable storage devices, such as secure digital (SD) cards. Memory 2220 may provide storage of computer-readable instructions, data structures, program modules, and other data for electronic system 2200. In some embodiments, memory 2220 may be distributed into different hardware modules. A set of instructions and/or code might be stored on memory 2220. The instructions might take the form of executable code that may be executable by electronic system 2200, and/or might take the form of source and/or installable code, which, upon compilation and/or installation on electronic system 2200 (e.g., using any of a variety of generally available compilers, installation programs, compression/decompression utilities, etc.), may take the form of executable code.

In some embodiments, memory 2220 may store a plurality of application modules 2222 through 2224, which may include any number of applications. Examples of applications may include gaming applications, conferencing applications, video playback applications, or other suitable applications. The applications may include a depth sensing function or eye tracking function. Application modules 2222-2224 may include particular instructions to be executed by processor(s) 2210. In some embodiments, certain applications or parts of application modules 2222-2224 may be executable by other hardware modules 2280. In certain embodiments, memory 2220 may additionally include secure memory, which may include additional security controls to prevent copying or other unauthorized access to secure information.

In some embodiments, memory 2220 may include an operating system 2225 loaded therein. Operating system 2225 may be operable to initiate the execution of the instructions provided by application modules 2222-2224 and/or manage other hardware modules 2280 as well as interfaces with a wireless communication subsystem 2230 which may include one or more wireless transceivers. Operating system 2225 may be adapted to perform other operations across the components of electronic system 2200 including threading, resource management, data storage control and other similar functionality.

Wireless communication subsystem 2230 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2200 may include one or more antennas 2234 for wireless communication as part of wireless communication subsystem 2230 or as a separate component coupled to any portion of the system. Depending on desired functionality, wireless communication subsystem 2230 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2230 may permit data to be exchanged with a network, other computer systems, and/or any other devices described herein. Wireless communication subsystem 2230 may include a means for transmitting or receiving data, such as identifiers of HMD devices, position data, a geographic map, a heat map, photos, or videos, using antenna(s) 2234 and wireless link(s) 2232. Wireless communication subsystem 2230, processor(s) 2210, and memory 2220 may together comprise at least a part of one or more of a means for performing some functions disclosed herein.

Embodiments of electronic system 2200 may also include one or more sensors 2290. Sensor(s) 2290 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2290 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2200 may include a display module 2260. Display module 2260 may be a near-eye display, and may graphically present information, such as images, videos, and various instructions, from electronic system 2200 to a user. Such information may be derived from one or more application modules 2222-2224, virtual reality engine 2226, one or more other hardware modules 2280, a combination thereof, or any other suitable means for resolving graphical content for the user (e.g., by operating system 2225). Display module 2260 may use liquid crystal display (LCD) technology, light-emitting diode (LED) technology (including, for example, OLED, ILED, µLED, AMOLED, TOLED, etc.), light emitting polymer display (LPD) technology, or some other display technology.

Electronic system 2200 may include a user input/output module 2270. User input/output module 2270 may allow a user to send action requests to electronic system 2200. An action request may be a request to perform a particular action. For example, an action request may be to start or end an application or to perform a particular action within the application. User input/output module 2270 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2200. In some embodiments, user input/output module 2270 may provide haptic feedback to the user in accordance with instructions received from electronic system 2200. For example, the haptic feedback may be provided when an action request is received or has been performed.

Electronic system 2200 may include a camera 2250 that may be used to take photos or videos of a user, for example, for tracking the user's eye position. Camera 2250 may also be used to take photos or videos of the environment, for example, for VR, AR, or MR applications. Camera 2250 may include, for example, a complementary metal-oxide-semiconductor (CMOS) image sensor with a few millions or tens of millions of pixels. In some implementations, camera 2250 may include two or more cameras that may be used to capture 3-D images.

In some embodiments, electronic system 2200 may include a plurality of other hardware modules 2280. Each of other hardware modules 2280 may be a physical module within electronic system 2200. While each of other hardware modules 2280 may be permanently configured as a structure, some of other hardware modules 2280 may be temporarily configured to perform specific functions or temporarily activated. Examples of other hardware modules 2280 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2280 may be implemented in software.

In some embodiments, memory 2220 of electronic system 2200 may also store a virtual reality engine 2226. Virtual reality engine 2226 may execute applications within electronic system 2200 and receive position information, acceleration information, velocity information, predicted future positions, or some combination thereof of the HMD device from the various sensors. In some embodiments, the information received by virtual reality engine 2226 may be used for producing a signal (e.g., display instructions) to display module 2260. For example, if the received information indicates that the user has looked to the left, virtual reality engine 2226 may generate content for the HMD device that mirrors the user's movement in a virtual environment. Additionally, virtual reality engine 2226 may perform an action within an application in response to an action request received from user input/output module 2270 and provide feedback to the user. The provided feedback may be visual, audible, or haptic feedback. In some implementations, processor(s) 2210 may include one or more GPUs that may execute virtual reality engine 2226.

In various implementations, the above-described hardware and modules may be implemented on a single device or on multiple devices that can communicate with one another using wired or wireless connections. For example, in some implementations, some components or modules, such as GPUs, virtual reality engine 2226, and applications (e.g., tracking application), may be implemented on a console separate from the head-mounted display device. In some implementations, one console may be connected to or support more than one HMD.

In alternative configurations, different and/or additional components may be included in electronic system 2200. Similarly, functionality of one or more of the components can be distributed among the components in a manner different from the manner described above. For example, in some embodiments, electronic system 2200 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, ABC, AAB, AABBCCC, or the like.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A waveguide display comprising a plurality of grating layers, the plurality of grating layers characterized by two or more different base refractive indices and including a set of volume Bragg gratings (VBGs) formed in the plurality of grating layers, wherein:
   each VBG of the set of VBGs is configured to diffract display light in a different respective field-of-view (FOV) and wavelength range;
   the set of VBGs includes a plurality of groups of VBGs; and
   VBGs in each respective group of the plurality of groups of VBGs are characterized by a same grating period and include at least one VBG in each grating layer of the plurality of grating layers, wherein VBGs in a first group and a second group of the plurality of groups of VBGs are characterized by different grating periods.

2. The waveguide display of claim 1, wherein each VBG of the VBGs in a group of the plurality of groups of VBGs is characterized by a different respective tilt angle.

3. The waveguide display of claim 1, wherein:
   a total number of grating layers of the plurality of grating layers is equal to a total number of VBGs in a group of the plurality of groups of VBGs; and
   each VBG of the VBGs in the group of the plurality of groups of VBGs is in a different respective grating layer of the plurality of grating layers.

4. The waveguide display of claim 1, wherein the VBGs in each respective group of the plurality of groups of VBGs include two or more VBGs in a same grating layer of the plurality of grating layers.

5. The waveguide display of claim 1, wherein two or more grating layers of the plurality of grating layers are characterized by a same base refractive index.

6. The waveguide display of claim 1, wherein the set of VBGs includes at least one of reflective VBGs or transmissive VBGs.

7. The waveguide display of claim 1, wherein VBGs in different groups of the plurality of groups of VBGs have different grating periods.

8. The waveguide display of claim 1, wherein a total number of VBGs in each group of the plurality of groups of VBGs is the same for the plurality of groups of VBGs.

9. The waveguide display of claim 8, wherein a tilt angle of an nth VBG in each group of the plurality of groups of VBGs is the same for the plurality of groups of VBGs, where n is an integer equal to or less than the total number of VBGs in each group of the plurality of groups of VBGs.

10. The waveguide display of claim 1, wherein the plurality of grating layers includes three or more grating layers characterized by different respective base refractive indices.

11. The waveguide display of claim 1, wherein:
    the plurality of grating layers forms an output grating of the waveguide display; and
    the set of VBGs is configured to, in combination, diffract display light in a full FOV and wavelength range of the waveguide display.

12. The waveguide display of claim 1, further comprising:
    a first waveguide assembly including a first substrate, a second substrate, and one or more grating layers of the plurality of grating layers between the first substrate and the second substrate;
    a second waveguide assembly including a third substrate, a fourth substrate, and one or more grating layers of the plurality of grating layers between the third substrate and the fourth substrate; and
    a spacer between the first waveguide assembly and the second waveguide assembly and configured to form an air gap between the first waveguide assembly and the second waveguide assembly,
    wherein a last VBG in a group of the plurality of groups of VBGs is in the one or more grating layers in the first waveguide assembly and a first VBG in a next group of the plurality of groups of VBGs is in the one or more grating layers in the second waveguide assembly.

13. The waveguide display of claim 12, wherein the FOV and wavelength range of the last VBG in the group of the plurality of groups of VBGs at least partially overlaps with the FOV and wavelength range of the first VBG in the next group of the plurality of groups of VBGs.

14. The waveguide display of claim 13, further comprising one or more light sources, wherein each light source of the one or more light sources is configured to emit light in a respective primary color that is characterized by a full-width-half-maximum spectral width less than 20 nm.

15. A waveguide display comprising:
    a first substrate;
    a second substrate; and
    a plurality of grating layers between the first substrate and the second substrate, the plurality of grating layers characterized by two or more different base refractive indices and including a set of volume Bragg gratings (VBGs) formed in the plurality of grating layers, wherein:
       each VBG of the set of VBGs is configured to diffract display light in a different respective field-of-view (FOV) and wavelength range; and
       each grating layer of the plurality of grating layers includes a subset of VBGs of the set of VBGs, wherein VBGs in the subset of VBGs are characterized by different respective grating periods.

16. The waveguide display of claim 15, wherein the VBGs in the subset of VBGs are characterized by a same tilt angle.

17. The waveguide display of claim 15, wherein:
    a grating layer of the plurality of grating layers includes an additional subset of VBGs of the set of VBGs; and
    a tilt angle of an mth VBG in the subset of VBGs in the grating layer is different from a tilt angle of an mth VBG in the additional subset of VBGs in the grating layer, wherein m is equal to or less than a total number of VBGs in the subset of VBGs in the grating layer.

18. The waveguide display of claim 17, wherein a first VBG in the subset of VBGs and a first VBG in the additional subset of VBGs are characterized by a same grating period.

19. The waveguide display of claim 15, wherein a grating period of a first VBG in the subset of VBGs in each grating layer of the plurality of grating layers is the same for the plurality of grating layers.

20. The waveguide display of claim 15, wherein:
    the plurality of grating layers forms an output grating of the waveguide display; and
    the set of VBGs is configured to, in combination, diffract display light in a full FOV and wavelength range of the waveguide display.

* * * * *